(12) United States Patent
Braunschweig

(10) Patent No.: US 12,709,361 B2
(45) Date of Patent: Aug. 18, 2026

(54) METHODS OF MAKING AND USING FLOATING RAISED PLANTER BED

(71) Applicant: SCHWIG OUTDOORS, LLC, Adel, IA (US)

(72) Inventor: Cory Braunschweig, Adel, IA (US)

(73) Assignee: SCHWIG OUTDOORS, LLC, Adel, IA (US)

( * ) Notice: Subject to any disclaimer, the term of this patent is extended or adjusted under 35 U.S.C. 154(b) by 0 days.

(21) Appl. No.: 19/029,387

(22) Filed: Jan. 17, 2025

(65) Prior Publication Data

US 2025/0236365 A1 Jul. 24, 2025

Related U.S. Application Data

(60) Provisional application No. 63/622,627, filed on Jan. 19, 2024.

(51) Int. Cl.
*A01G 9/02* (2018.01)
*B63B 35/44* (2006.01)

(52) U.S. Cl.
CPC .............. *B63B 35/44* (2013.01); *A01G 9/028* (2013.01); *B63B 2035/4493* (2013.01)

(58) Field of Classification Search
CPC ........ A01G 9/028; A01G 9/027; A01G 9/033; A01G 9/28; A01G 31/024; A01G 31/02; B63B 2035/4493
See application file for complete search history.

(56) References Cited

U.S. PATENT DOCUMENTS 2,175,113 A * 10/1939 Fischer .................... A01C 1/02 47/14
4,468,885 A * 9/1984 Mandish ................ A01G 31/02 47/65
7,481,175 B2 1/2009 Dickman
9,611,880 B1 4/2017 Church et al.
11,606,916 B2 * 3/2023 Noordam ................ B63B 35/44
2007/0130828 A1 * 6/2007 Mathy .................... A01G 9/033 47/79
2009/0107039 A1 * 4/2009 Kania ...................... A01G 9/28 47/65.5
2016/0270303 A1 * 9/2016 Cooley ................ A01G 31/024
2018/0187429 A1 * 7/2018 Lim ........................ E04D 3/357
2020/0383276 A1 * 12/2020 Walker ................. A01G 9/0295
2022/0322613 A1 * 10/2022 Lam ..................... A01G 9/0293
2024/0306561 A1 * 9/2024 Hoti ....................... A01G 9/028

FOREIGN PATENT DOCUMENTS

CA 2092485 A * 9/1994 ............. A01G 9/028
FR 2917572 A1 * 12/2008 ............. E01C 9/004
FR 3073123 A1 * 5/2019 ............. A01G 9/028

OTHER PUBLICATIONS

Biolchini translation, FR3073123, retrieved from EPO: Jan. 31, 2026 (Year: 2017).*

* cited by examiner

*Primary Examiner* — Kristen C Hayes

(74) *Attorney, Agent, or Firm* — McKee, Voorhees & Sease, PLC

(57) ABSTRACT

A floating raised planter bed with innovative buoyant flotation capabilities is designed to mitigate flood damage to plants and property. The floating raised planter bed can comprise one or more planter bed sections. The floating raised planter bed has built-in buoyant structure that allows it to rise and float during flooding events, which not only safeguards the plants it contains but also enhances flood resilience in urban and suburban areas.

1 Claim, 17 Drawing Sheets

METHODS OF MAKING AND USING FLOATING RAISED PLANTER BED

CROSS-REFERENCE TO RELATED APPLICATIONS

This application claims priority under 35 U.S.C. § 119 to provisional patent application U.S. Ser. No. 63/622,627, filed Jan. 19, 2024. The provisional patent application is herein incorporated by reference in its entirety, including without limitation, the specification, claims, and abstract, as well as any figures, tables, appendices, or drawings thereof.

TECHNICAL FIELD

The present disclosure relates generally to a planter bed section, a floating raised planter bed, and/or a corresponding method of use/manufacture having applications in at least the agricultural industry. More particularly, but not exclusively, the present disclosure relates to a planter bed section and/or a floating raised planter bed for sustainable gardening.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

Traditional, non-floating planter beds lack adaptability and are prone to flood damage. Their fixed placement can be a liability during heavy rains and floods, as they can't rise with rising water levels, resulting in plant loss and compromised landscaping. In urban environments, non-floating planter beds are often obstructive during floods, hindering water flow and exacerbating inundation risks. The absence of buoyancy and appropriate water drainage in traditional planters limits their functionality as they cannot adapt to fluctuating water levels, affecting plant health and overall aesthetics. In regions susceptible to periodic flooding, non-floating planter beds are at odds with the need for resilient landscaping. Their lack of mobility and adaptability poses a significant challenge for maintaining green spaces in flood-prone areas, necessitating alternative solutions.

Thus, there exists a need in the art for an apparatus which enables the cultivation of plants through buoyant floatation as a proactive flood mitigation tool, plant loss mitigation tool, and as a tool to mitigate compromised landscaping.

SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present disclosure to improve on or overcome the deficiencies in the art.

It is a further object, feature, and/or advantage of the present disclosure to provide a raised planter bed capable of buoyant floatation, thereby enabling easy relocation and adjustment of the garden layout. For example, the raised planter bed allows gardeners to effortlessly adapt to changing sunlight conditions.

It is a further object, feature, and/or advantage of the present disclosure to provide for the cultivation of plants through buoyant flotation as a proactive flood mitigation tool, plant loss mitigation tool, and as a tool to mitigate compromised landscaping.

It is still yet a further object, feature, and/or advantage of the present disclosure to provide for improved water drainage and root aeration for healthier plant growth.

The planter bed section and/or floating raised planter bed disclosed herein can be used in a wide variety of applications. For example, the planter bed section and/or floating raised planter bed make it possible to create aquatic gardens with ease, improve the utilization of limited garden space, enable the easy removal of plants for maintenance or replacement, and reduce the environmental impact through water conservation and plant protection during floods or heavy rain.

It is preferred the apparatus be safe, cost effective, and durable. For example, the planter bed's construction materials are non-toxic and pose no harm to plants or the environment. The apparatus can be adapted to resist excessive heat, static buildup, corrosion, and/or mechanical failures (e.g. cracking, crumbling, shearing, creeping) due to excessive impacts and/or prolonged exposure to tensile and/or compressive forces acting on the apparatus.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the planter bed section and/or the floating raised planter bed.

Methods can be practiced which facilitate use, manufacture, assembly, maintenance, and repair of a planter bed section and/or floating raised planter bed which accomplish some or all of the previously stated objectives.

The planter bed section and/or floating raised planter bed can be incorporated into systems or kits which accomplish some or all of the previously stated objectives.

According to some aspects of the present disclosure, a planter bed section comprises a top portion comprising: first and second side walls; first and second end walls; and one or more recesses located between the first and second side walls, wherein each of the one or more recesses comprises an aperture; a bottom portion operatively attached to the top portion, the bottom portion comprising: first and second opposing sides; first and second opposing ends; one or more tube members wherein one of the one or more tube members is operatively connected to each aperture of the one or more recesses.

According to some additional aspects of the present disclosure, each of the first and second opposing sides of the bottom portion comprises at least one hitch member; and each of the first and second opposing ends of the bottom portion comprises at least one hitch member.

According to some additional aspects of the present disclosure, each hitch member is configured to mate with the same or similar hitch member of another planter bed section to operatively attach the planter bed section to the other planter bed section to form a floating raised planter bed.

According to some additional aspects of the present disclosure, each of the first and second sides comprises at least one chute member.

According to some additional aspects of the present disclosure, the top portion comprises two recesses separated by a separator member.

According to some additional aspects of the present disclosure, each of the first and second end walls of the top portion comprises an indentation.

According to some additional aspects of the present disclosure, the bottom portion further comprises a plurality of cavities generally surrounding at least one of the one or more tube members, According to some additional aspects of the present disclosure, the plurality of cavities alternately include long cavities and short cavities.

According to some additional aspects of the present disclosure, the plurality of cavities includes at least five cavities.

According to some additional aspects of the present disclosure, the aperture of each of the one or more recesses is located generally at the lowest point of the recess.

According to some additional aspects of the present disclosure, each of the one or more recesses comprises a base wherein any liquid material therein filters toward the aperture of each of the one or more recesses and can drain from the aperture of each of the one or more recesses.

According to some additional aspects of the present disclosure, the planter bed section is buoyant.

According to some other aspects of the present disclosure, a method of using the planter bed section of claim 1 comprises operatively attaching the planter bed section of claim 1 to a docking piece.

According to some additional aspects of the present disclosure, the method further comprises placing seed and/or plant material in and/or at the planter bed section.

According to some additional aspects of the present disclosure, the seed and/or plant material is related to human or animal nutrition and/or is related to ornamental purposes.

According to some additional aspects of the present disclosure, the seed and/or plant material is related to medicinal purposes and/or is related to fuel or fiber purposes.

According to some additional aspects of the present disclosure, the docking piece is floating and the planter bed section is used for growing plant material over a body of water.

According to some additional aspects of the present disclosure, the docking piece is not floating and the planter bed section is used for growing plant material over land.

According to some other aspects of the present disclosure, a method of making a floating raised planter bed comprises operatively attaching a first planter bed section to a second planter bed section via at least one of the hitch members of the first planter bed section and/or via at least one of the hitch members of the second planter bed section; and operatively attaching the operatively attached first and second planter bed sections to a docking piece.

According to some additional aspects of the present disclosure, the docking piece is floating and the floating raised planter bed is used for growing plant material over a body of water.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

In addition, as will be understood, any of the aspects of any of the embodiments shown and/or described herein could be combined with one another to form any number of embodiments, whether expressly disclosed or not, which would be understood by one skilled in the art.

An artisan of ordinary skill in the art need not view, within isolated figure(s), the near infinite distinct combinations of features described in the following detailed description to facilitate an understanding of the present disclosure.

DETAILED DESCRIPTION

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

Embodiments of the present disclosure, as best mode for carrying out the subject matter of the disclosure, will be described hereinafter with reference to the drawings. It is to be understood that the embodiments described herein are not intended as limiting, or encompassing the entire scope of, the present disclosure.

In one embodiment, a planter bed section described herein, floating raised planter bed described herein, and/or any aspects of the planter bed section and/or the floating raised planter bed, is produced by rotational molding. The rotomolding or rotational molding plastic process produces large hollow parts or components of virtually any size or shape. In rotomolding, plastic resins are poured into the open cavity of a mold. The exact type and amount of resin is dictated by the part's predetermined "recipe" based on the desired wall thickness and other characteristics. The mold or tool is then closed and bolted shut creating a tight seal. The tool is attached to one of the arms of the rotational molding machine. Typically, each arm of the rotomold machine can hold multiple molds of similar size.

The rotational molding machine has three stages (1) loading and unloading, (2) insertion into gas ovens generating high temperature, and (3) insertion into a cooling station. Once the open mold is loaded and closed, the machine's arm is moved into the gas oven. The arm articulates spinning the mold using centrifugal force to melt and evenly spread the resin throughout the mold and into the corners. The mold will spin for a period of time as the recipe stipulates. The molds then move into the cooling chamber and continue to spin while they're cooled either with air or cold water. The rotomolding process is completed when the mold is opened, the part is removed, and then the mold is again filled closed and bolted shut ready for another cycle. Rotationally molded parts may be used in air or water-tight applications such as flotation devices, tanks, rain barrels, and road barriers.

Figure 1:
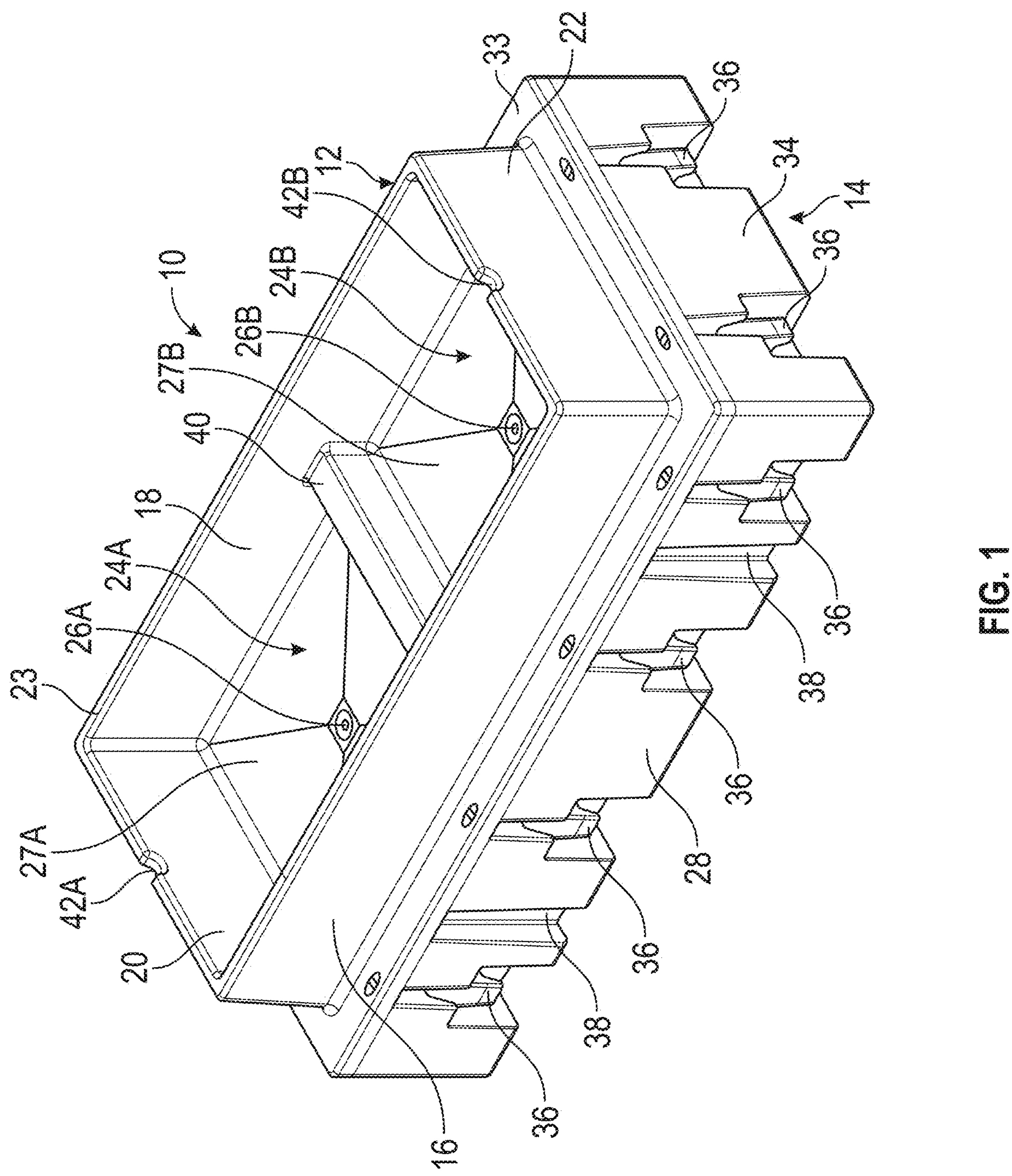
FIG. 1 shows a perspective view of a planter bed section according to at least some aspects of the present disclosure.

Referring to FIGS. 1-8, a planter bed section 10, according to one embodiment of the present disclosure, is shown. FIG. 1 shows the planter bed section 10 comprising a top portion 12 including first and second side walls 16, 18 and first and second end walls 20, 22, and a bottom portion 14 comprising first and second sides 28, 30 and first and second ends 32, 34. The top portion 12 can be made of any suitable material capable of holding liquid and/or solid contents such as plastic and the like. Similarly, the bottom portion 14 can be made of any suitable material capable of holding liquid and/or solid contents such as plastic and the like. According to some embodiments, the planter bed section 10 can be mostly and/or fully hollow. According to some embodiments, the planter bed section 10 can be buoyant meaning that it can be configured to float on liquid, such as water.

According to some embodiments, the first and second side walls 16, 18 of the top portion 12 can be spaced about 33.44 inches apart. According to some embodiments, the first and second side walls 16, 18 of the top portion 12 can be spaced about 37.06 inches apart. However, the top portion 12 could be configured to include any suitable distance between the first and second side walls 16, 18. According to some embodiments, the first and second end walls 20, 22 of the top portion 12 can be spaced about 85.06 inches apart. However, the top portion 12 could be configured to include any suitable distance between the first and second end walls 20, 22.

As shown in at least FIG. 1, according to some embodiments, the top portion 12 can further comprise one or more recesses. As an example, the embodiment of FIGS. 1-8 shows two recesses 24A, 24B. According to some embodiments, one or both of the first and second side walls 16, 18 and/or one or both of the first and second end walls at least partially form the one or more recesses 24A, 24B. For example, as shown in at least FIG. 1, the first side wall 16, second side wall 18, and first end wall 20 at least partially form the recess 24A, and the first side wall 16, second side wall 18, and second end wall 22 at least partially form the recess 24B. Each recess 24A, 24B forms a contained volume that can be filled from the top with soil, seed, other growth material such as peat or compost, plant material such as any sort of plants like ornamental flowers, bushes, vegetable plants, and the like. Each recess 24A and 24B is capable of holding liquid and/or solid material.

According to some embodiments, each recess, such as the recesses 24A and 24B of at least FIG. 1, can include a base representing the lowest most point of and/or a floor of the recess wherein the base includes an aperture positioned at or near the lowest most point of the recess. For example, the recess 24A of FIG. 1 can include a base 27A representing the lowest point of and/or a floor of the recess 24A wherein the base 27A can include an aperture 26A positioned at or near the lowest point of the recess 24A, and the recess 24B can include a base 27B representing the lowest point of and/or a floor of the recess 24B wherein the base 27B can include an aperture 26B positioned at or near the lowest point of the recess 24B. According to some embodiments, each base 27A, 27B can be generally flat. According to various embodiments, each aperture of each recess can be generally circular or generally rectangular such as generally square. For generally circular apertures, the diameter of each aperture can be any suitable size. For example, according to some embodiments, the diameter of each aperture is about 1 inch. According to some embodiments, the diameter of each aperture is about 2.25 inches. For example, the diameter of each aperture 26A, 26B is about 1 inch.

Figure 10:
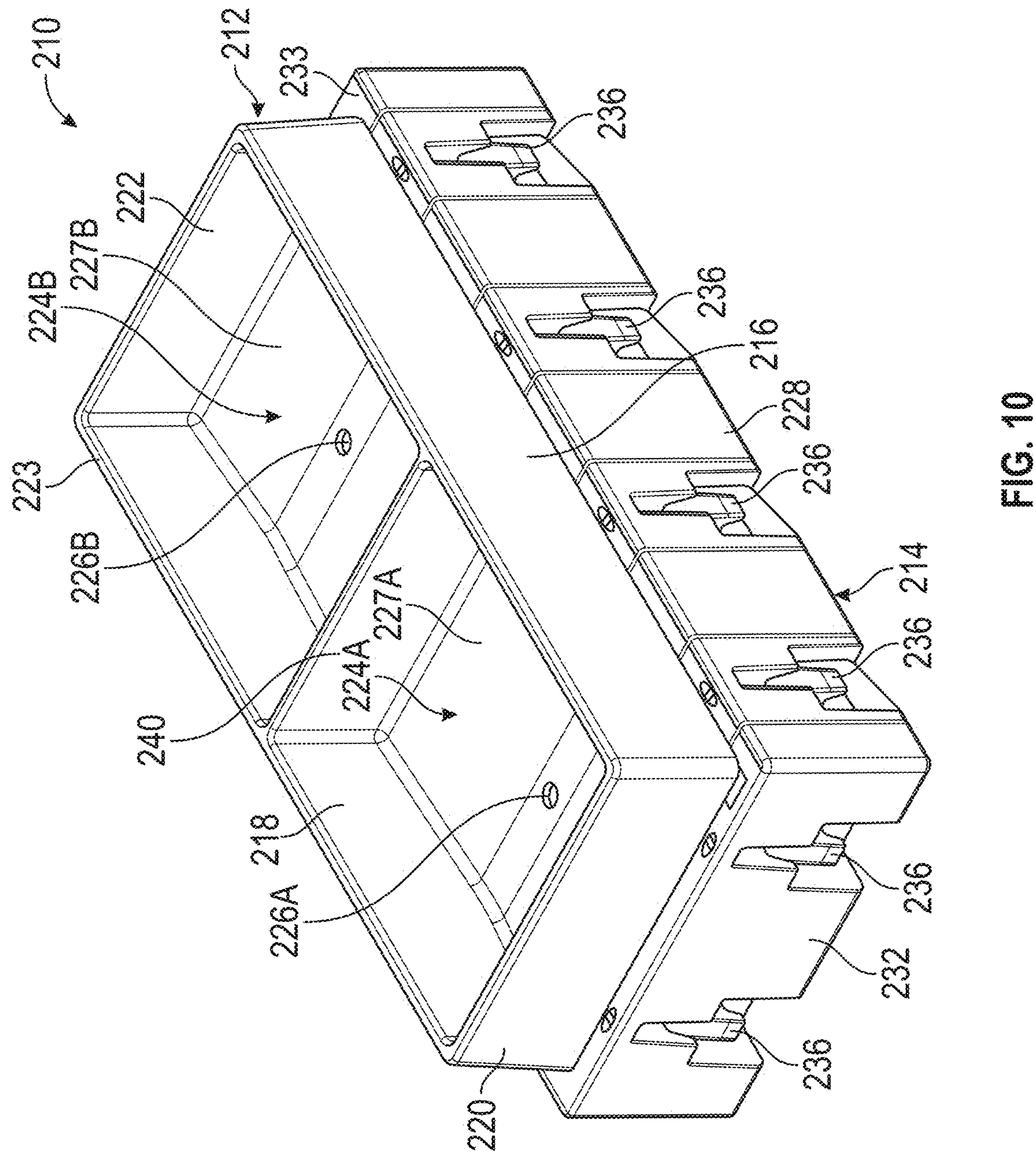
FIG. 10 shows a perspective view of a planter bed section according to at least some aspects of the present disclosure.

Each base of each recess, such as the bases 27A and 27B, can be configured to include a generally flat floor for each recess. According to some embodiments and as shown in at least FIG. 1, the bases 27A and 27B can each include four quadrants wherein each quadrant is generally flat and is generally adjacent to the aperture 26A or 26B. One quadrant can be generally adjacent to the first side wall 16, one quadrant can be generally adjacent to the second side wall 18, one quadrant can be generally adjacent to either the first end wall 20 or the second end wall 22, and one quadrant can be generally adjacent to a separator member 40, described in more detail herein. According to some embodiments and as shown in FIG. 10, each base can include two portions positioned on either side of the aperture.

Each aperture of each recess, such as the apertures 26A and 26B, can be and/or comprise an opening through which liquid, such as water, is able to flow. For example, excessive rain and/or other liquid such as water (due to flooding or any other reason) entering the planter bed section 10 can pass through one of the apertures 26A or 26B and exit the planter bed section 10. The apertures 26A and 26B allow for the outflow of excessive liquid, such as water, from the recesses 24A and 24B, respectively. By allowing the water or other liquid to exit the planter bed section 10, the planter bed section 10 thereby prevents any plant material, such as plants, in the planter bed section 10 from drowning. The planter bed section 10 is configured so that liquid, such as water, will find its way to the apertures 26A, 26B so that the liquid can enter the apertures 26A, 26B and drain from and/or exit the planter bed section 10.

As shown in at least FIG. 1, the recesses 24A, 24B are separated by a separator member 40. The separator member 40 can be and/or comprise any sort of structure and/or object capable of separating the recesses 24A, 24B and preventing, at least partially, the contents of the two recesses 24A, 24B from mixing. According to some embodiments, the separator member 40 can be made of the same material as the top portion 12 and can be formed via molding and/or rotational molding in the same and/or similar manner as the rest of the top portion 12 is formed. According to some embodiments, the height of the separator member 40 is less than the height of a top edge 23 of the top portion 12. According to other embodiments, the height of the separator member 40 is generally equal to the height of the top edge 23 of the top portion 12.

According to some embodiments, the height of the top portion 12, extending from the aperture 26A or 26B at the base 27A or 27B of the recess 24A or 24B to the top edge 23 of the top portion 12, is about 14 inches. However, the top portion 12 could be configured to have any suitable height. The top edge 23 of the top portion 12 refers to the top, outer rim of the planter bed section 10 that includes the top of the first and second side walls 16, 18 and the top of the first and second end walls 20, 22.

As shown in at least FIG. 1, each of the first and second end walls 20, 22 can comprise an indentation, shown as first and second indentations 42A and 42B. Each indentation 42A, 42B can be and/or comprise a cutout or other form of an indentation wherein each indentation 42A, 42B is adjacent to the top edge 23 of the top portion 12. As shown in FIG. 1, the indentations 42A and 42B can be aligned. While each of the first and second end walls 20, 22 are shown to comprise one indentation in FIG. 1, each of the first and second end walls 20, 22 could comprise any number of indentations. According to some embodiments, each of the first and second end walls 20, 22 can comprise two indentations. According to embodiments wherein each of the first and second end walls 20, 22 include two indentations, the indentations can be positioned to create two pairs of aligned indentations. According to some embodiments, at least one cavity 44 of a plurality of cavities 44 (explained in detail herein) can be aligned with a pair of aligned indentations such as indentations 42A and 42B.

According to some embodiments, the height of the bottom portion 14, measured from a bottom edge 35 of the bottom portion 14 to a top edge 33 of the bottom portion 14, can be about 20 inches. However, the height of the bottom portion 14 can be any suitable size. The bottom edge 35 of the bottom portion 14 refers to the bottom face of the bottom portion 14. The top edge of the bottom portion 14 refers to the top face of the bottom portion 14 that is adjacent with and operatively attached to the upper portion 12. According to some embodiments, the width of the bottom portion 14, measured from the first side 28 to the second side 30, can be about 48 inches. However, the width of the bottom portion 14 can be any suitable distance. According to some embodiments, the length of the bottom portion 14, measured from the first end 32 to the second end 34, can be about 96 inches. However, the length of the bottom portion 14 can be any suitable distance.

Figure 6:
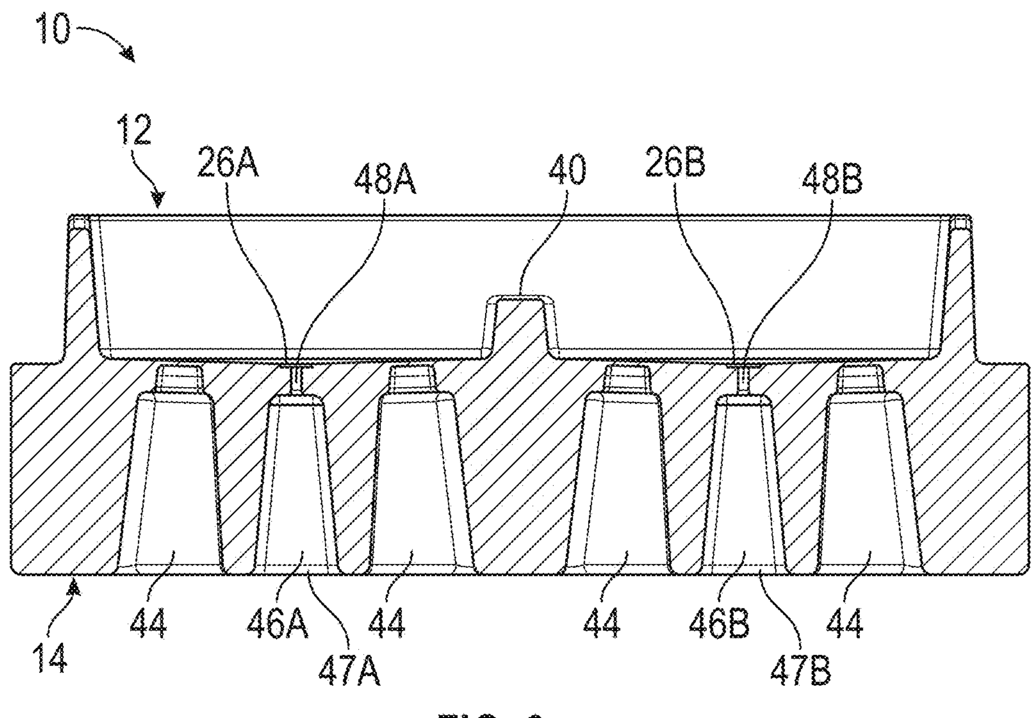
FIG. 6 shows a right side cross-sectional view of the planter bed section of FIG. 1, the left side cross-sectional view being a mirror image thereof.
Figure 7:
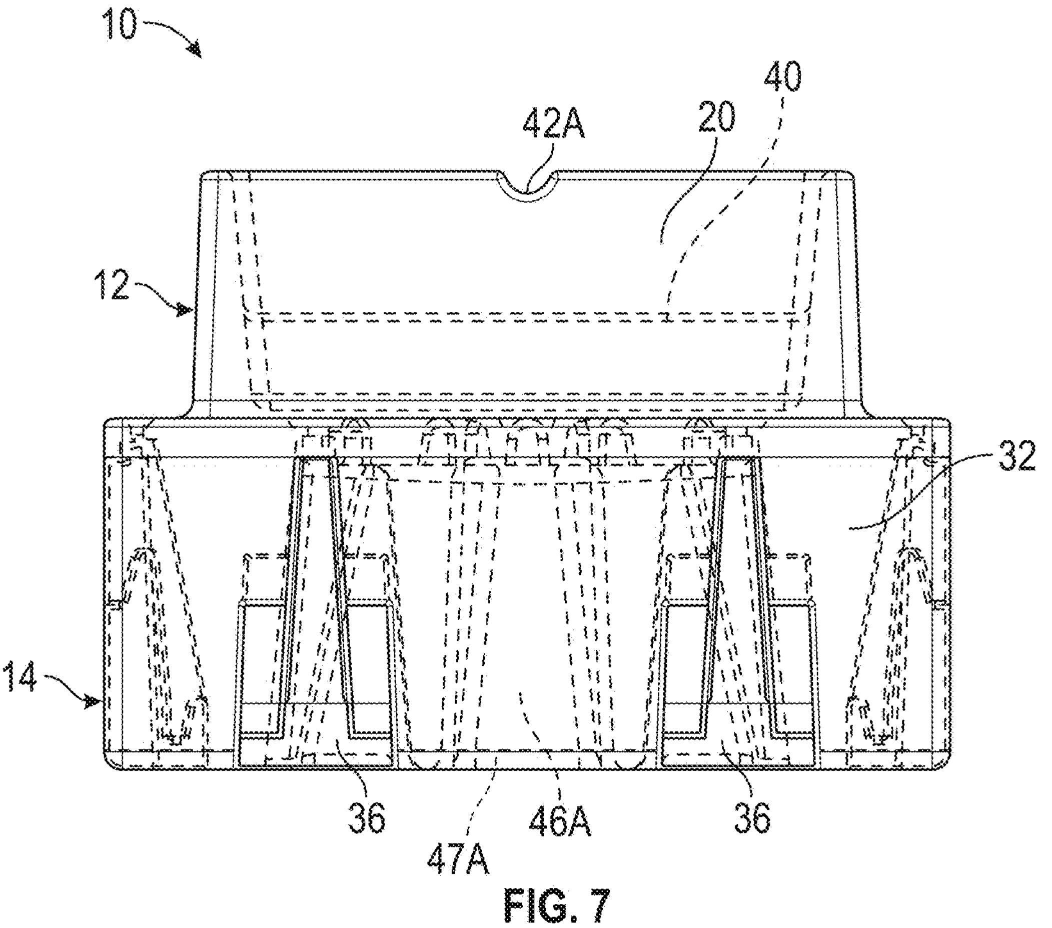
FIG. 7 shows a front cross-sectional view of the planter bed section of FIG. 1, the rear cross-sectional view being a mirror image thereof.
Figure 8:
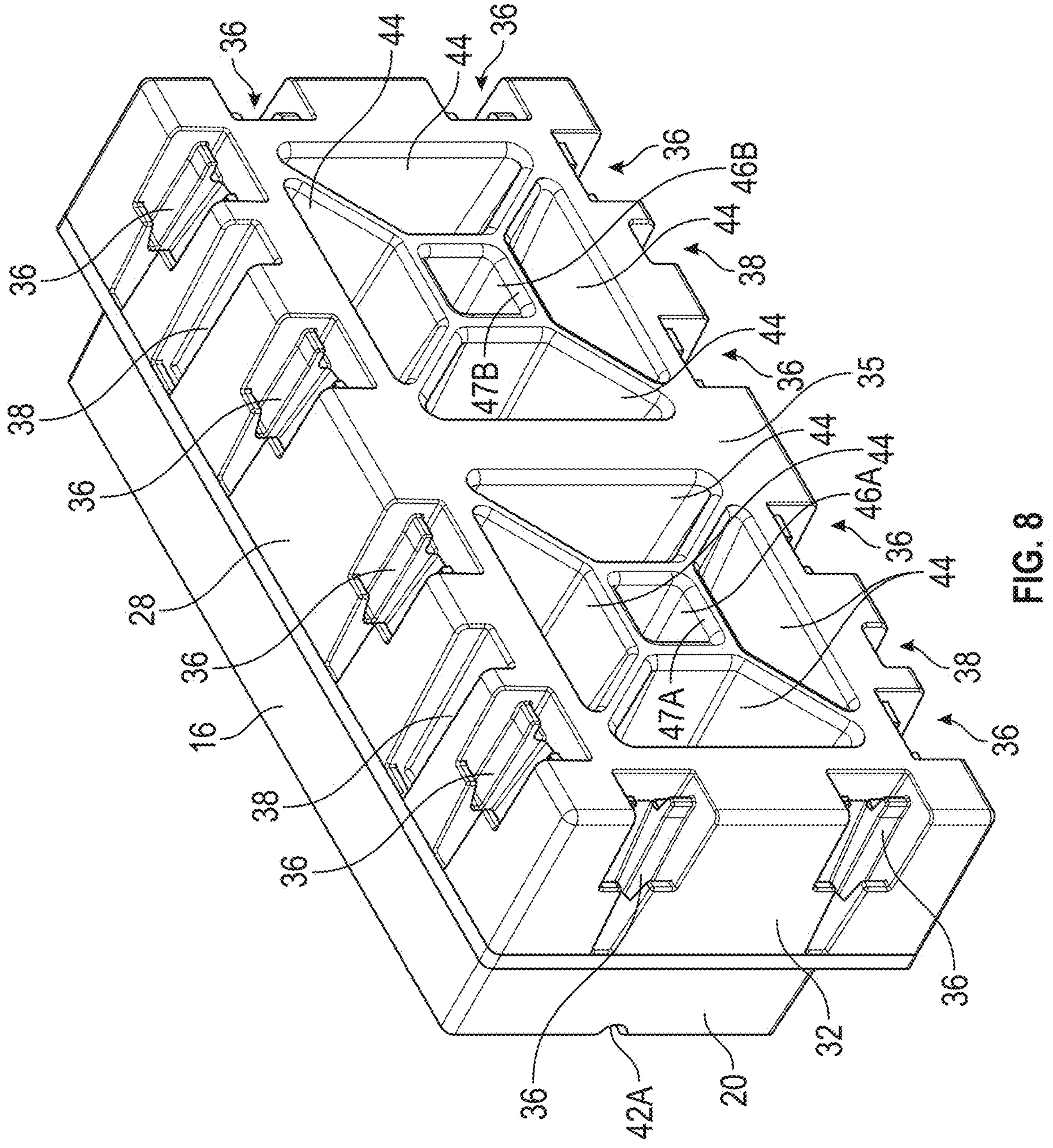
FIG. 8 shows a bottom perspective view of the planter bed section of FIG. 1.

The use of the planter bed section 10 of the present disclosure is further explained in FIG. 8. In particular, the plurality of cavities 44 is shown in FIG. 8. Each cavity 44 of the plurality of cavities 44 can be mostly and/or fully hollow, thereby at least partially rendering the planter bed section 10 to be mostly and/or fully hollow. The hollow nature of the plurality of cavities 44, and planter bed section 10 in general, causes and/or contributes to the ability of the planter bed section 10 to float. According to some embodiments, each cavity 44 of the plurality of cavities 44 can be aligned in parallel with one another and can extend upward and terminate at or near the top portion 12 and/or terminate at or near the top edge 33 of the bottom portion 14. According to some embodiments, the plurality of cavities 44 can include long cavities and short cavities, and said long and short cavities can be positioned such that the long and short cavities alternate. According to some embodiments, the planter bed section 10 comprises at least five cavities 44. According to some embodiments, each cavity 44 of the plurality of cavities 44 has ends that are adjacent to the first and second ends 32, 34 of the bottom portion 14. FIG. 6 also shows the plurality of cavities 44.

Figure 2:
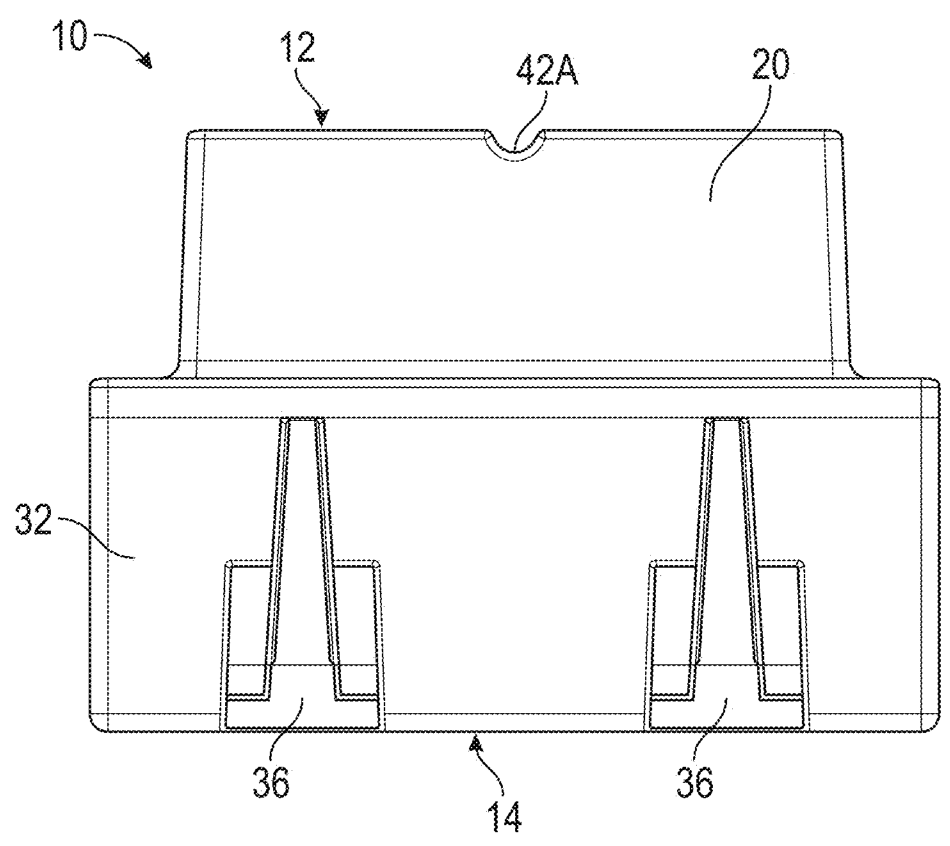
FIG. 2 shows a front elevational view of the planter bed section of FIG. 1, the rear elevational view being a mirror image thereof.

As shown in at least FIGS. 1 and 2, each of the first and second ends 32, 34 of the bottom portion 14 comprise two hitch members 36. While each of the first and second ends 32, 34 of the bottom portion are shown to include two hitch members 36, any suitable number of hitch members could be included. As shown in FIGS. 1 and 2, according to some embodiments, the hitch members 36 of the first and second ends 32, 34 of the bottom portion 14 can be spaced apart. Additionally, according to some embodiments, the hitch member(s) 36 of the first end 32 can be aligned with the hitch member(s) 36 of the second end 34. Thus, the hitch member(s) 36 of the first end 32 and the hitch member(s) 36 of the second end 34 can form one or more aligned pairs of hitch members 36.

Figure 3:
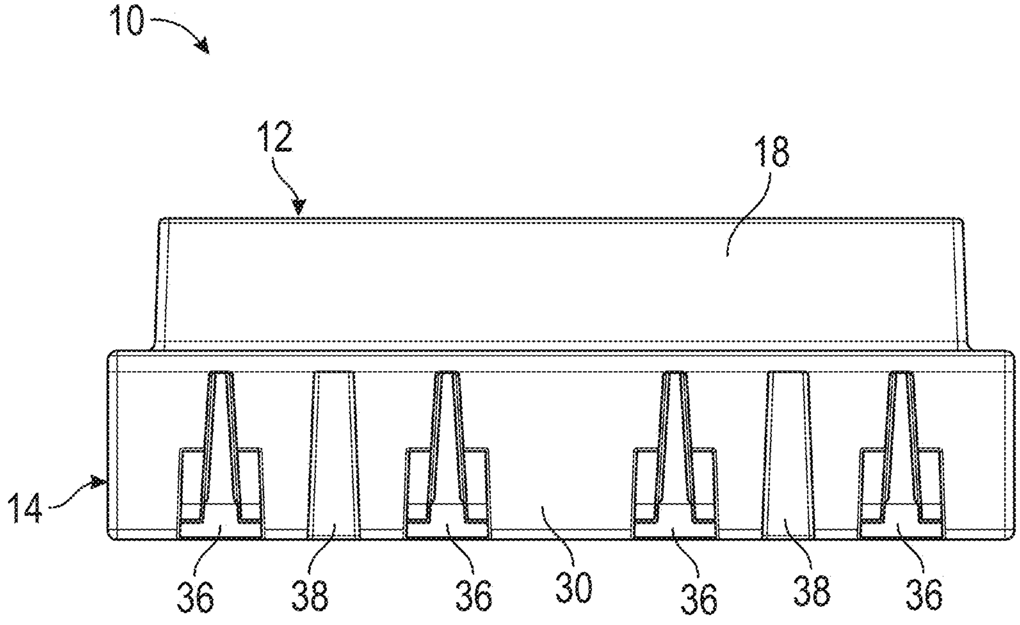
FIG. 3 shows a right side elevational view of the planter bed section of FIG. 1, the left side elevational view being a mirror image thereof.
Figure 4:
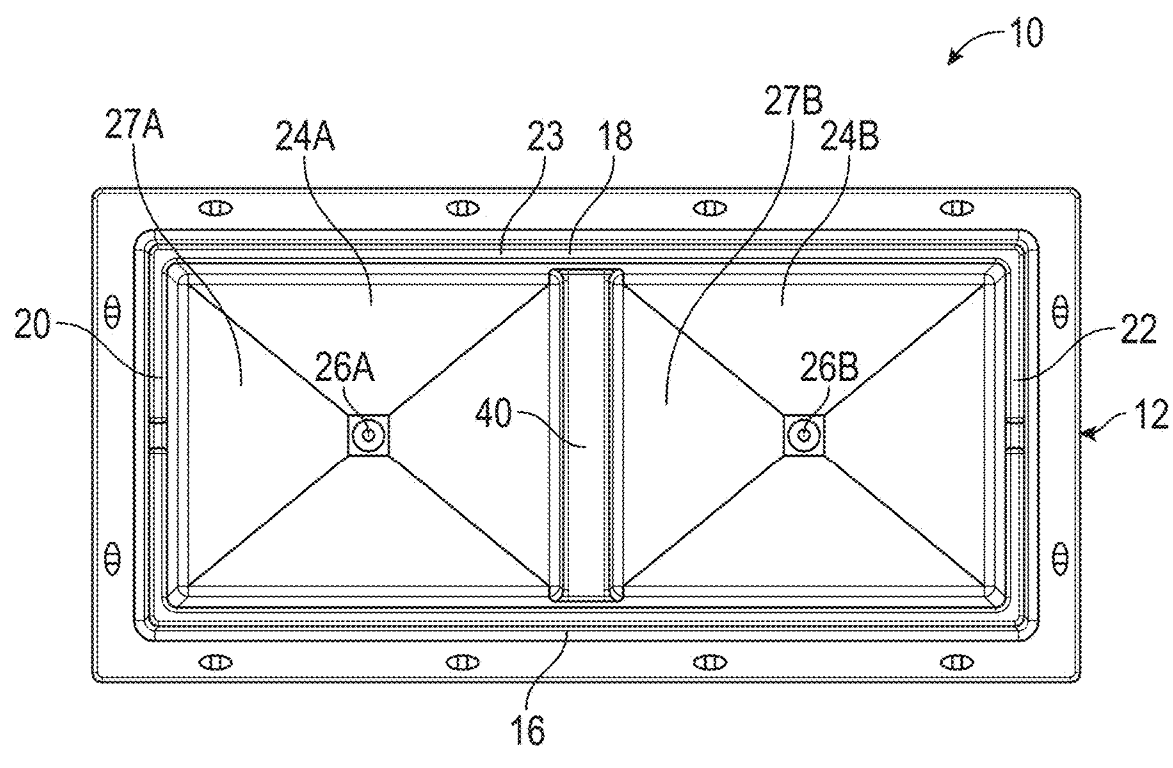
FIG. 4 shows a top plan view of the planter bed section of FIG. 1.
Figure 5:
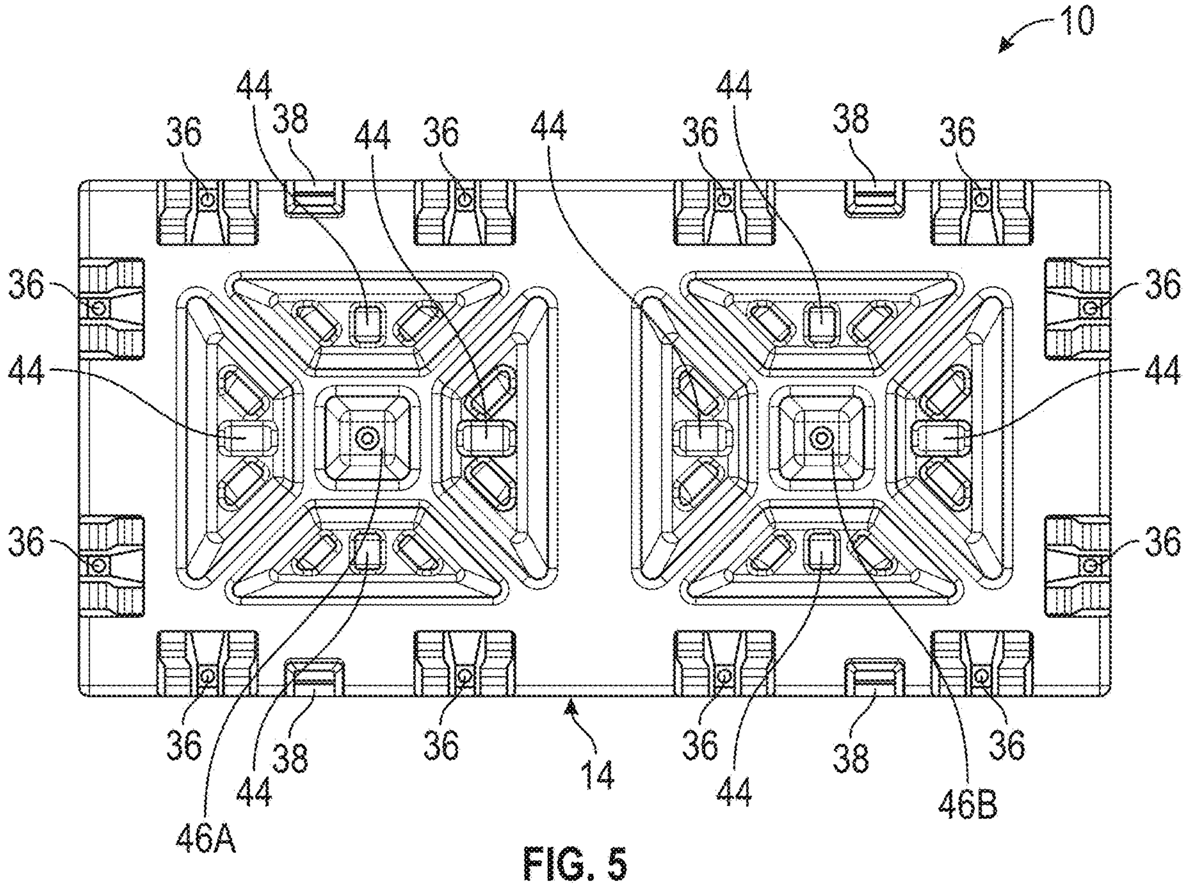
FIG. 5 shows a bottom plan view of the planter bed section of FIG. 1.

As shown in at least FIGS. 1 and 3, each of the first and second sides 28, 30 of the bottom portion 14 comprise four hitch members 36. While each of the first and second ends 32, 34 of the bottom portion are shown to include four hitch members 36, any suitable number of hitch members could be included. As shown in FIGS. 1 and 3, according to some embodiments, the hitch members 36 of the first and second sides 28, 30 of the bottom portion 14 can be spaced apart. Additionally, according to some embodiments, the hitch member(s) 36 of the first side 28 can be aligned with the hitch member(s) 36 of the second side 30. Thus, the hitch member(s) 36 of the first side 28 and the hitch member(s) 36 of the second side 30 can form one or more aligned pairs of hitch members 36. According to some embodiments, at least one cavity 44 of the plurality of cavities 44 can be aligned with one of the aligned pairs of hitch members 36 of the first and second ends 32, 34 and/or the first and second sides 28, 30.

According to some embodiments, each hitch member 36 can be and/or comprise any sort of attachment and/or connection mechanism capable of operatively attaching two or more planter bed sections 10 and/or capable of attaching a planter bed section 10 to a docking piece (described herein). For example, according to some embodiments, each hitch member 36 can be and/or comprise friction fit technology, interlocking elements (for example, elements capable of mating with each other), tab(s), spacer(s), adhesive, hook and loop(s), snap(s), nut(s) and bolt(s), screw(s), nail(s), and/or any other type of attachment and/or connection means. For example, according to some embodiments, hitch member(s) 36 of one planter bed section 10 can engage (matingly or otherwise) with hitch member(s) 36 of another planter bed section 10 to facilitate operative attachment between the two planter bed sections 10. Additionally or alternatively, each hitch member 36 can comprise an aperture and indentation surrounding said aperture, wherein the aperture and indentation are positioned at and/or near the top edge 33 of the bottom portion 14. The aperture and surrounding indentation of each hitch member 36 can facilitate operative connection of the planter bed section 10 to another planter bed section, to a docking piece (described herein), and/or to any other suitable structure. For example, according to some embodiments, a nut, bolt, screw, nail, and/or another suitable component can be used in conjunction with the aperture and surrounding indentation to facilitate operative connection of the planter bed section 10 to another planter bed section, to a docking piece (described herein), and/or to any other suitable structure. Additionally or alternatively, according to some embodiments, each hitch member 36 can be mostly and/or fully hollow. The mostly and/or fully hollow nature of each hitch member 36 can cause and/or contribute to the ability of the planter bed section 10 to float. Each hitch member 36 can be configured to extend generally from the bottom edge 35 to the top edge 33 of the bottom portion 14.

As shown in FIGS. 1 and 3, each of the first side 28 and the second side 30 of the bottom portion 14 includes two chute members 38. While the first side 28 and the second side 30 are shown to include two chute members 38, any number of chute members ranging from zero to N where N is any number greater than zero could be included on each of the first side 28 and second side 30. According to some embodiments, the width of each chute member 38 is about 3.52 inches. According to some embodiments, the width of each chute member 38 is about 3.28 inches. However, the width of each chute member 38 can be any suitable distance.

According to some embodiments, each chute member 38 can be and/or comprise a mostly and/or fully hollow cavity-like space. According to some embodiments, the mostly and/or fully hollow nature of each chute member 38 can cause and/or contribute to the ability of the planter bed section 10 to float. Additionally and/or alternatively, each chute member 38 can help facilitate operative attachment between one or more planter bed sections 10. For example, according to some embodiments, chute member(s) 38 of one planter bed section 10 can engage (matingly or otherwise) with chute member(s) 38 of another planter bed section 10 to facilitate operative attachment between the two planter bed sections 10. Each chute member 38 can be configured to extend generally from the bottom edge 35 to the top edge 33 of the bottom portion 14.

FIGS. 6 and 8 show first and second tube members 46A, 46B that are each operatively connected to the first and second apertures 26A, 26B, respectively. Excess liquid, such as water, can outflow and/or drain from the recesses 24A, 24B, via the apertures 26A, 26B and, subsequently, via the tube members 46A, 46B. The tube members 46A, 46B can be and/or comprise any sort of mostly and/or fully hollow vessel such as a tube, channel, piping, and the like. A bottom end 47A, 47B of each tube member 46A, 46B, respectively, can terminate at and/or near the bottom edge 35 of the bottom portion 14, such that excess liquid draining and/or outflowing from the recesses 24A, 24B can pass through the tube members 46A, 46B and exit the bottom portion 14 via the bottom ends 47A, 47B of tube members 46A, 46B. Additionally, as shown in FIG. 6, according to some embodiments, first and second connector members 48A, 48B can operatively connect the first and second tube members 46A, 46B to the first and second apertures 26A, 26B, respectively. Each of the connector members 48A, 48B can be any sort of mostly and/or fully hollow vessel such as a tube, channel, piping, and the like, capable of controlling and/or allowing the flow and/or draining of liquid. For example, the first and second connector members 48A, 48B can be configured such that excess liquid, such as water, is able to flow from the recesses 24A, 24B, through the apertures 26A, 26B, through the connector members 48A, 48B, and into the tube members 46A, 46B, and then eventually exit the planter bed section 10 via the bottom ends 47A, 47B of the tube members 46A, 46B.

According to some embodiments, the planter bed section 10 is configured to displace sufficient water to float the planter bed section 10, and/or any floating raised planter bed 302 (described in greater detail herein) of which the planter bed section 10 is a part, plus soil, seed, plants, plant material, and/or any other contents of the planter bed section 10 when placed in or contacted by a body of water.

The planter bed section 10 is configured such that excessive rain, water, or other liquid falling into and/or otherwise entering the planter bed section 10 will pass through the aperture(s) 26A, 26B of the recess(es) 24A, 24B and exit the planter bed section 10, thereby preventing the plants and/or plant material from drowning. The aperture(s) 26A, 26B allow for the outflow of excessive water from the recess(es) 24A, 24B of the planter box section 10.

Figure 9:
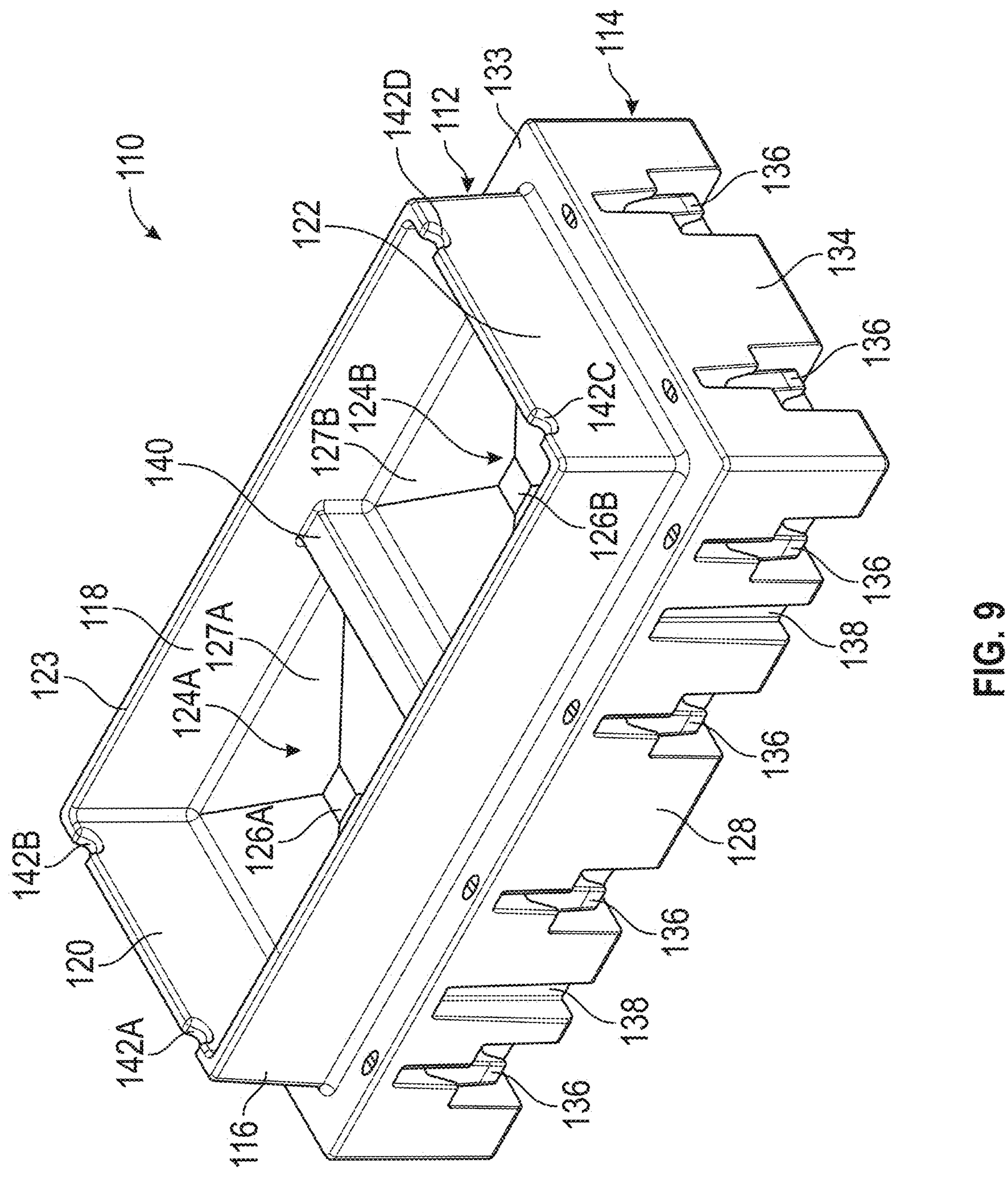
FIG. 9 shows a perspective view of a planter bed section according to at least some aspects of the present disclosure.

FIG. 9 shows a perspective view of an embodiment of a planter bed section 110 according to at least some aspects of the present disclosure. The planter bed section 110 of FIG. 9 comprises a top portion 112 that includes a first side wall 116, a second side wall 118, a first end wall 120, and a second end wall 122. The first and second side walls 116, 118 and the first and second end walls 120, 122 combine to create a top edge 123 of the top portion 112. As shown in FIG. 9, the top portion 112 further comprises first and second recesses 124A, 124B. Each of the first and second recesses 124A, 124B can comprise an aperture. As shown in FIG. 9, the first recess 124A comprises a first aperture 126A, and the second recess 124B comprises a second aperture 126B. The first recess 124A can comprise a first base 127A at the base/bottom/floor of the first recess 124A wherein the first base 127A is generally flat and includes the first aperture 126A. The second recess 124B can comprise a second base 127B at the base/bottom/floor of the second recess 124B wherein the second base 127B is generally flat and includes the second aperture 126B. As shown in FIG. 9, the top portion 112 can further comprise a separator member 140 configured to separate the first and second recesses 124A and 124B.

As shown in FIG. 9, the planter bed section 110 can comprise a bottom portion 114 that includes a first side 128, a second side (unlabeled) that is a mirror image of the first side, a first end (unlabeled) that is a mirror image of a second end 134, and the second end 134. As shown in FIG. 9, each of the first side 128 and the second side of the bottom portion 114 can include four hitch members 136 and two chute members 138. However, any suitable number of hitch members 136 and/or chute members 138 could be included. As shown in FIG. 9, the bottom portion 114 can further comprise a top edge 133. The first end and the second end 134 can each comprise two hitch members 136. However, any suitable number of hitch members 136 could be included.

All similarly named components between the planter bed section 10 and the planter bed section 110 can be the same and/or similar, can function in the same and/or similar manner, and/or can have the same and/or similar characteristics. Additionally, the planter bed section 110 can further include any and/or all components of the planter bed section 10.

As shown in FIG. 9, each of the first and second end walls 120, 122 of the top portion 112 of the planter bed section 110 can include two indentations. Thus, the first end wall 120 includes first and second indentations 142A and 142B, and the second end wall 122 includes third and fourth indentations 142C and 142D. As shown in FIG. 9, indentations 142A and 142C can be aligned to form a pair of aligned indentations. Similarly, indentations 142B and 142D can be aligned to form another pair of aligned indentations. While four indentations are included in the embodiment shown in FIG. 9, any suitable number of indentations could be included.

FIG. 10 shows a perspective view of an embodiment of a planter bed section 210 according to at least some aspects of the present disclosure. The planter bed section 210 of FIG. 10 comprises a top portion 212 that includes a first side wall 216, a second side wall 218, a first end wall 220, and a second end wall 222. The first and second side walls 216, 218 and the first and second end walls 220, 222 combine to create a top edge 223 of the top portion 212. As shown in FIG. 10, the top portion 212 further comprises first and second recesses 224A, 224B. Each of the first and second recesses 224A, 224B can comprise an aperture. As shown in FIG. 10, the first recess 224A comprises a first aperture 226A, and the second recess 224B comprises a second aperture 226B. The first recess 224A can comprise a first base 227A at the base/bottom/floor of the first recess 224A wherein the first base 227A is generally flat and includes the first aperture 226A. The second recess 224B can comprise a second base 227B at the base/bottom/floor of the second recess 224B wherein the second base 227B is generally flat and includes the second aperture 226B. As shown in FIG. 10, the top portion 212 can further comprise a separator member 240 configured to separate the first and second recesses 224A and 224B. As shown in FIG. 10, the separator member 240 can be generally the same height as the first side wall 216, second side wall 218, first end wall 220, and/or second end wall 222.

As noted herein, according to some embodiments and as shown in FIG. 10, each base 227A, 227B can include two portions positioned on either side of and adjacent, or nearly adjacent, to the aperture 226A or 226B. One of these portions can be generally adjacent to either the first end wall 220 or to the second end wall 222. The other portion can be generally adjacent to the separator member 240.

As shown in FIG. 10, the planter bed section 210 can comprise a bottom portion 214 that includes a first side 228, a second side (unlabeled) that is a mirror image of the first side, a first end 232, and a second end (unlabeled) that is a mirror image of a first end 232. As shown in FIG. 10, each of the first side 228 and the second side of the bottom portion 214 can include four hitch members 236. However, any suitable number of hitch members 236 could be included. As shown in FIG. 10, the bottom portion 214 can further comprise a top edge 233. The first end 232 and the second end can each comprise two hitch members 136. However, any suitable number of hitch members 236 could be included. As shown in FIG. 10, each of the first side 232 and second side of the bottom portion 214 can include zero chute members. However, any number of chute members could be included.

All similarly named components between the planter bed section 10 and the planter bed section 210 can be the same and/or similar, can function in the same and/or similar manner, and/or can have the same and/or similar characteristics. Additionally, the planter bed section 210 can further include any and/or all components of the planter bed section 10.

As shown in FIG. 10, each of the first and second end walls 220, 222 of the top portion 212 of the planter bed section 210 can include zero indentations. However, any suitable number of indentations could be included.

Figure 11:
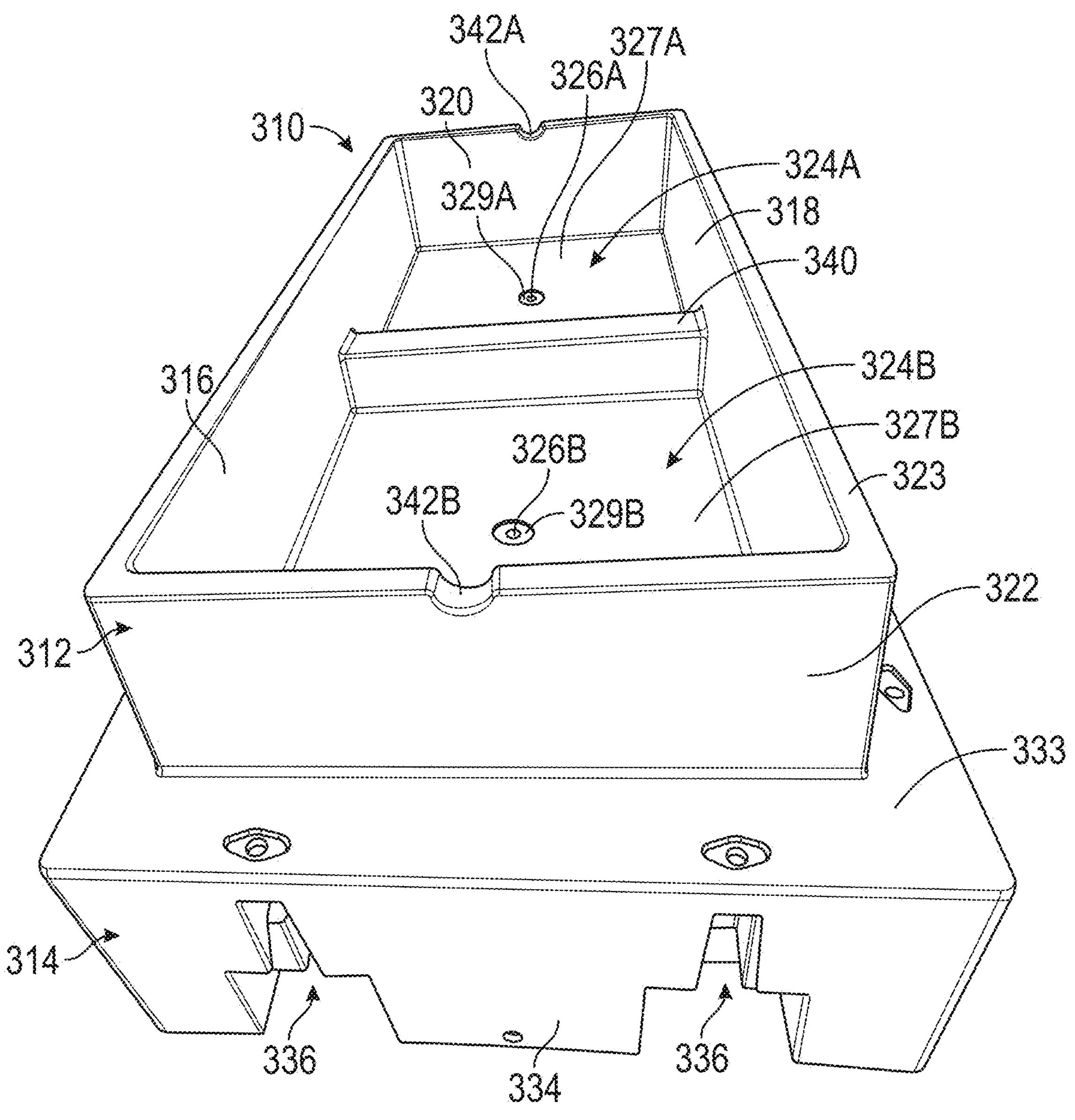
FIG. 11 shows a top perspective view of a planter bed section according to at least some aspects of the present disclosure.

FIG. 11 shows a top perspective view of a planter bed section 310 according to at least some aspects of the present disclosure. The planter bed section 310 shown in FIG. 11 can be and/or comprise any planter bed section, or component thereof, described herein such as the planter bed section 10, the planter bed section 110, and/or the planter bed section 210. Additionally or alternatively, according to some embodiments, the planter bed section 310 can be the same and/or similar, can function in the same and/or similar manner, and/or can have the same and/or similar characteristics and/or components as any planter bed section described herein. Additionally or alternatively, all similarly named components between the planter bed section 10 and the planter bed section 310 can be the same and/or similar, can function in the same and/or similar manner, and/or can have the same and/or similar characteristics. For example, as shown in FIG. 11, the planter bed section 310 can include a top portion 312 wherein the top portion 312 comprises a first side wall 316, a second side wall 318, a first end wall 320, a second end wall 322, and a top edge 323 which refers to the top, outer rim of the planter bed section 310 that includes the top of the first and second side walls 316, 318 and the top of the first and second end walls 320, 322. As shown in FIG. 11, the first end wall 320 can include a first indentation 342A, and the second end wall 322 can include a second indentation 342B. Further, the planter bed section 310 can include a bottom portion 314 (shown in detail in FIG. 14), wherein the bottom portion includes a top edge 333 thereof.

As shown in FIG. 11, the planter bed section 310 can include a first recess 324A and a second recess 324B. Further, as shown in FIG. 11, the first and second recesses 324A, 324B can be separated by a separator member 340.

As shown in FIG. 11, the first recess 324A can comprise a base 327A wherein the base 327A can comprise an aperture 326A and a first recessed area 329A surrounding the aperture 326A. According to some embodiments, the aperture 326A can be generally circular and can have a diameter of about 1 inch and/or a circumference of about 1 inch. However, the aperture 326A could be of any suitable size and/or shape. According to some embodiments, the first recessed area 329A can be generally circular and can have a diameter of about 2.5 inches and/or a circumference of about 2.5 inches. However, the first recessed area 329A could be of any suitable size and/or shape. As shown in FIG. 11, the first recessed area 329A can generally surround the aperture 326A such that the aperture 326A is positioned generally at or near the center of the first recessed area 329A. The first recessed area 329A can be recessed into the base 327A such that the first recessed area 329A is indented downward into the base 327A. In this way, the first recessed area 329A can form the lowest most point of the base 327A and the lowest most point of the first recess 324A. Thus, since the aperture 326A can be positioned at and/or within the recessed area 329A, the aperture 326A can be positioned generally at the lowest most point of the base 327A and the lowest most point of the first recess 324A. Therefore, liquid, such as water, that is in the first recess 324A will filter to, toward, and/or into the first recessed area 329A and then into the aperture 326A. As shown in FIG. 11, the second recess 324B can comprise a base 327B wherein the base 327B can comprise an aperture 326B and a second recessed area 329B. The second recess 324B, base 327B, aperture 326B, and second recessed area 329B can be a mirror image of and function in the same manner as the first recess 324A, base 327A, aperture 326A, and first recessed area 329A, respectively.

Figure 12:
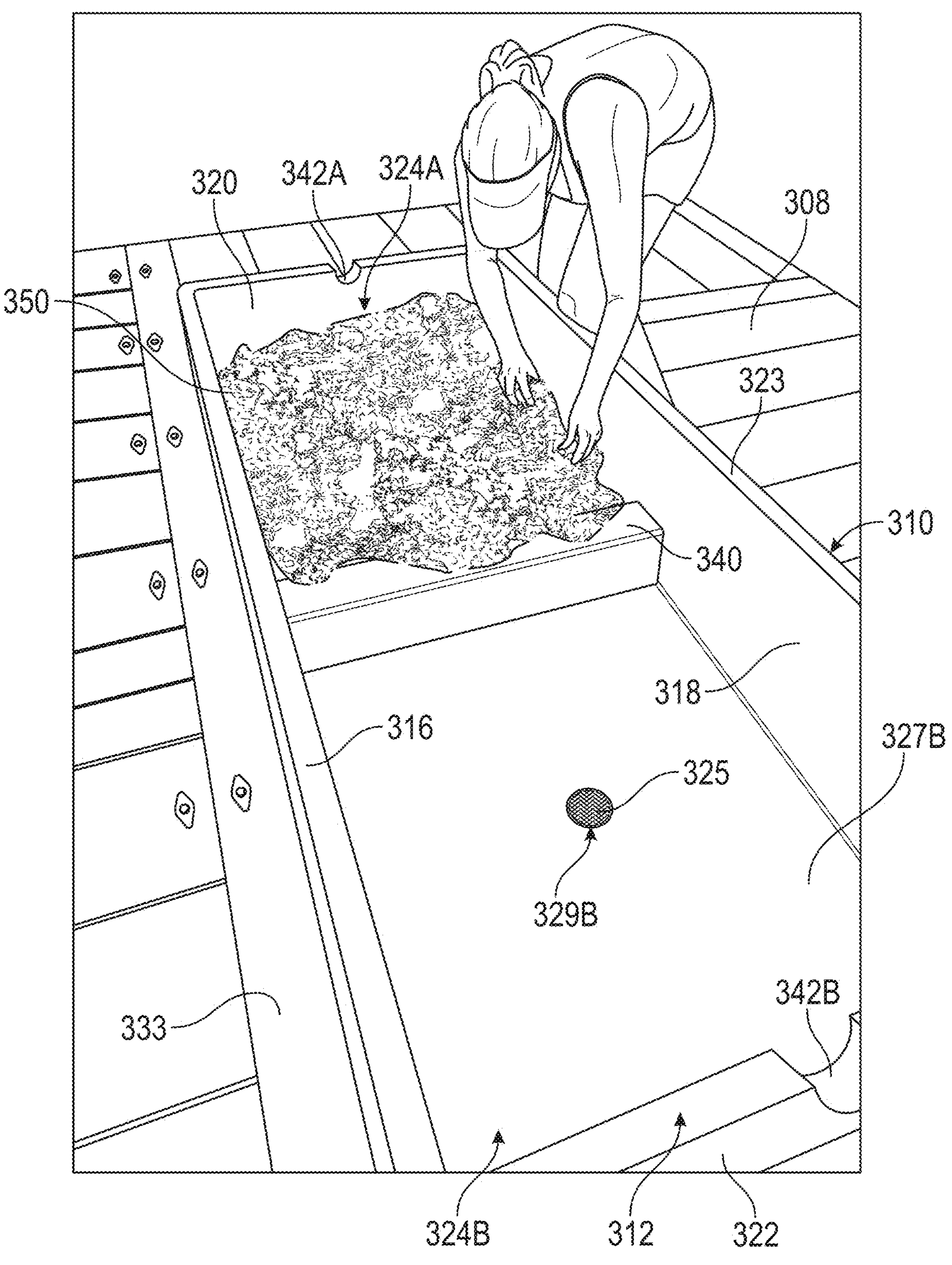
FIG. 12 shows a top perspective view of the planter bed section of FIG. 11 operationally attached to a docking piece.

FIG. 12 shows a top perspective view of the planter bed section 310 operationally attached to a docking piece 308 according to at least some aspects of the present disclosure. The docking piece 308 can be and/or comprise any sort of permanent, semi-permanent, and/or stationary dock-like structure capable of anchoring the planter bed section 310 in water. Additionally or alternatively, according to some embodiments, the docking piece 308 can be and/or comprise any sort of structure capable of anchoring and/or holding the planter bed section 310 on and/or over land. According to some embodiments, the docking piece 308 can be capable of floating in water. The planter bed section 310 can be operatively connected to the docking piece 308 in order to anchor, secure, and/or hold the planter bed section 310 in place. Such connection of the planter bed section 310 to the docking piece 308 can be facilitated via any suitable connection and/or attachment means such as friction fit technology, use of nut(s) and bolt(s), tab(s), interlocking elements (such as mating elements), spacer(s), adhesive, hook and loop(s), snap(s), and the like and/or via the hitch member(s) 336 and/or the chute member(s) 338. As shown in FIG. 12, the docking piece 308 can be configured to support a human user such that a human user can stand, sit, walk, run, or otherwise move on the docking piece 308. According to some embodiments, the docking piece 308 can be any docking piece described herein such as the docking piece 404.

As shown in FIG. 12, the first recess 324A comprises dirt, soil, seed, and/or plant material 350. While both recesses 324A and 324B are configured to be able to hold and/or contain dirt, soil, seed, and/or planter material, as an example, only the first recess 324A is shown to hold and/or contain dirt, soil, seed, and/or planter material 350.

Further, as shown in FIG. 12, the aperture 326B and second recessed area 329B can include a cover 325. While the cover 325 is only shown in FIG. 12 as being utilized with the aperture 326B and the second recessed area 329B, a cover 325 could be utilized with one, both, or none of the apertures 326A and/or 326B. For example, the aperture 326A and the first recessed area 329A could include a cover 325. Thus, the planter bed section 310 could include zero, one, or two covers 325.

As shown in FIG. 12, the cover 325 can be operationally attached to the base 327B and/or second recessed area 329B of the second recess 324B and can be positioned above and adjacent to the aperture 326B and/or can be operationally attached to the aperture 326B. The cover 325 can be any sort of mesh-type structure and/or any sort of structure with relatively small aperture(s) that allows liquid to pass into the aperture 326B while preventing most and/or all solid particles from passing into the aperture 326B. In this way, the cover 325 acts as a guard for the aperture 326B such that only desirable substance(s) pass into the aperture 326B. According to some embodiments, it is desirable to allow liquid to pass into the aperture 326B and to prevent all or most solid material from passing into the aperture 326B. Such embodiments wherein the cover 325 is configured to allow liquid to pass into the aperture 326B while preventing all or most solid material from passing into the aperture 326B can be advantageous. For example, such embodiments allow excess water and/or liquid to pass into the aperture 326B to drain from the planter bed section 310 without allowing any solid material, such as dirt, soil, seed, and/or plant material, to pass into the aperture 326B. Preventing solid material from passing into the aperture 326B can help prevent clogging of the aperture and/or other portion(s) of the planter bed section 310 and can help prevent any solid material, such as dirt, soil, seed, and/or plant material, from inadvertently exiting the planter bed section 310. As noted, a cover 325 could also be used in the same manner in conjunction with the aperture 326A, the first recessed area 329A, and/or the base 327A.

Figure 13:
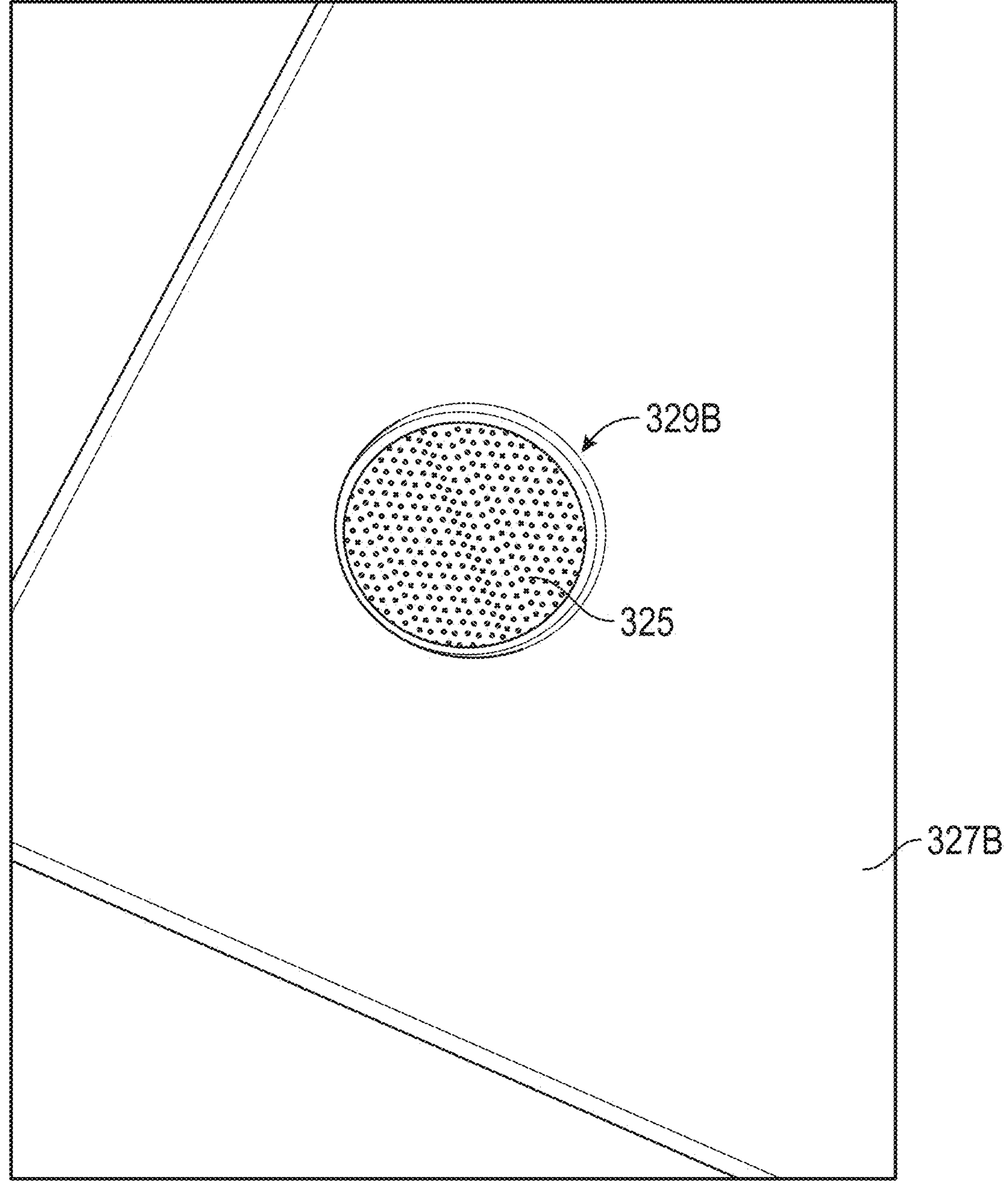
FIG. 13 shows an enlarged view of aspects of the planter bed section of FIG. 11.

FIG. 13 shows an enlarged view of the cover 325. As shown in FIG. 13 and as mentioned herein, the cover 325 can be operationally attached to the base 327B of the second recess 324B and/or to the second recessed area 329B and can be positioned above and adjacent to the aperture 326B and/or operationally attached to the aperture 326B. According to some embodiments, the cover 325 can be configured to rest on and/or in the second recessed area 329B. Additionally or alternatively, the cover 325 can be configured to fit snugly onto and/or into the second recessed area 329B.

Figure 14:
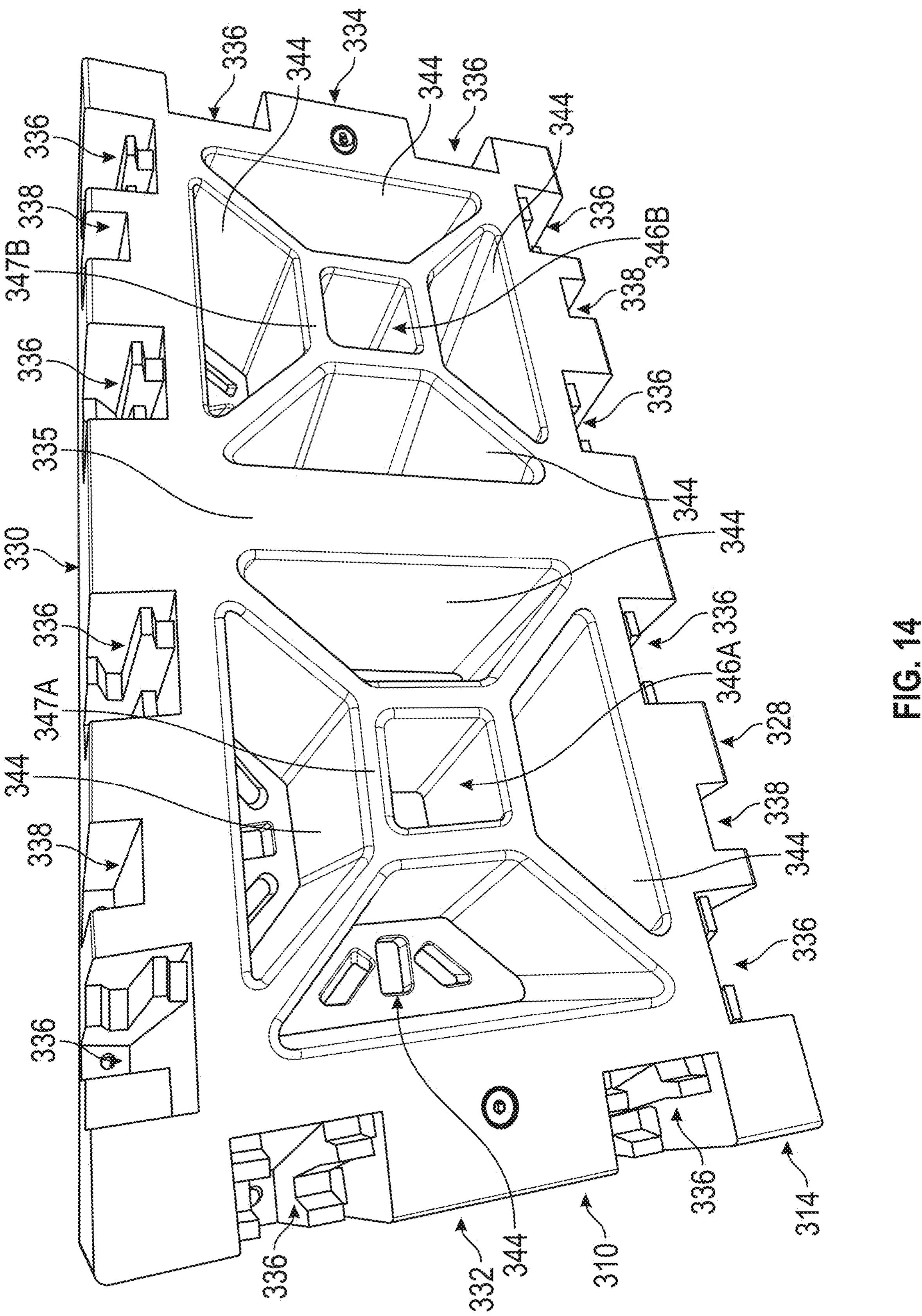
FIG. 14 shows a bottom perspective view of the planter bed section of FIG. 11.

FIG. 14 shows a bottom perspective view of the planter bed section 310. As shown in FIG. 14, the planter bed section 310 can include a bottom portion 314 wherein the bottom portion 314 comprises a first side 328, a second side 330, a first end 332 a second end 334, and a bottom edge 335. Further, as shown in FIG. 14, the sides 328, 330 and/or the ends 332, 334 of the bottom portion 314 can include any suitable number of hitch member(s) 336 and/or chute member(s) 338. For example, in the embodiment shown in FIG. 14, each of the first and second sides 328, 330 includes four hitch members 336 and two chute members 338, and each of the first and second ends 332, 334 includes two hitch members 336. However, each of the first and second sides 328, 330 and/or the first and second ends 332, 334 can include any suitable number of hitch member(s) 336 and/or chute member(s) 338. The hitch member(s) 336 can be the same as and/or similar to and can function in the same and/or similar manner and for the same and/or similar purpose as any hitch member described herein such as the hitch member 36, the hitch member 136, and/or the hitch member 236. The chute member(s) 338 can be the same as and/or similar to and can function in the same and/or similar manner and for the same and/or similar purpose as any chute member described herein such as the chute member 38 and/or the chute member 138.

As shown in FIG. 14, the bottom portion 314 can further include first and second tube members 346A, 346B. The first tube member 346A can be operationally connected to the aperture 326A of the first recess 324A, and the second tube member 346B can be operationally connected to the aperture 326B of the second recess 324B. Each of the tube members 346A, 346B can extend from the top edge 333 of the bottom portion 314 to the bottom edge 335 of the bottom portion 314. The first tube member 346A can extend from the aperture 326A of the first recess 324A to a bottom end 347A of the first tube member 346A, wherein said bottom end 347A is positioned at and/or near the bottom edge 335. The second tube member 346B can extend from the aperture 326B of the second recess 324B to a bottom end 347B of the second tube member 346B, wherein said bottom end 347B is positioned at and/or near the bottom edge 335. Each tube member 346A, 346B can be the same as and/or similar to and can function in the same and/or similar manner and for the same and/or similar purpose as any tube member described herein such as the tube members 46A, 46B.

As shown in FIG. 14, each tube member 346A, 346B can be surrounded by zero or more cavities 344. For example, the embodiment of FIG. 14 shows four cavities 344 surrounding each tube member 346A, 346B. As shown in FIG. 14, each cavity 344 can be trapezoidal in shape, however, each cavity 344 could embody any suitable shape. Each cavity 344 can be the same as and/or similar to and can function in the same and/or similar manner and for the same and/or similar purpose as any cavity described herein such as the cavity 44.

Figure 15:
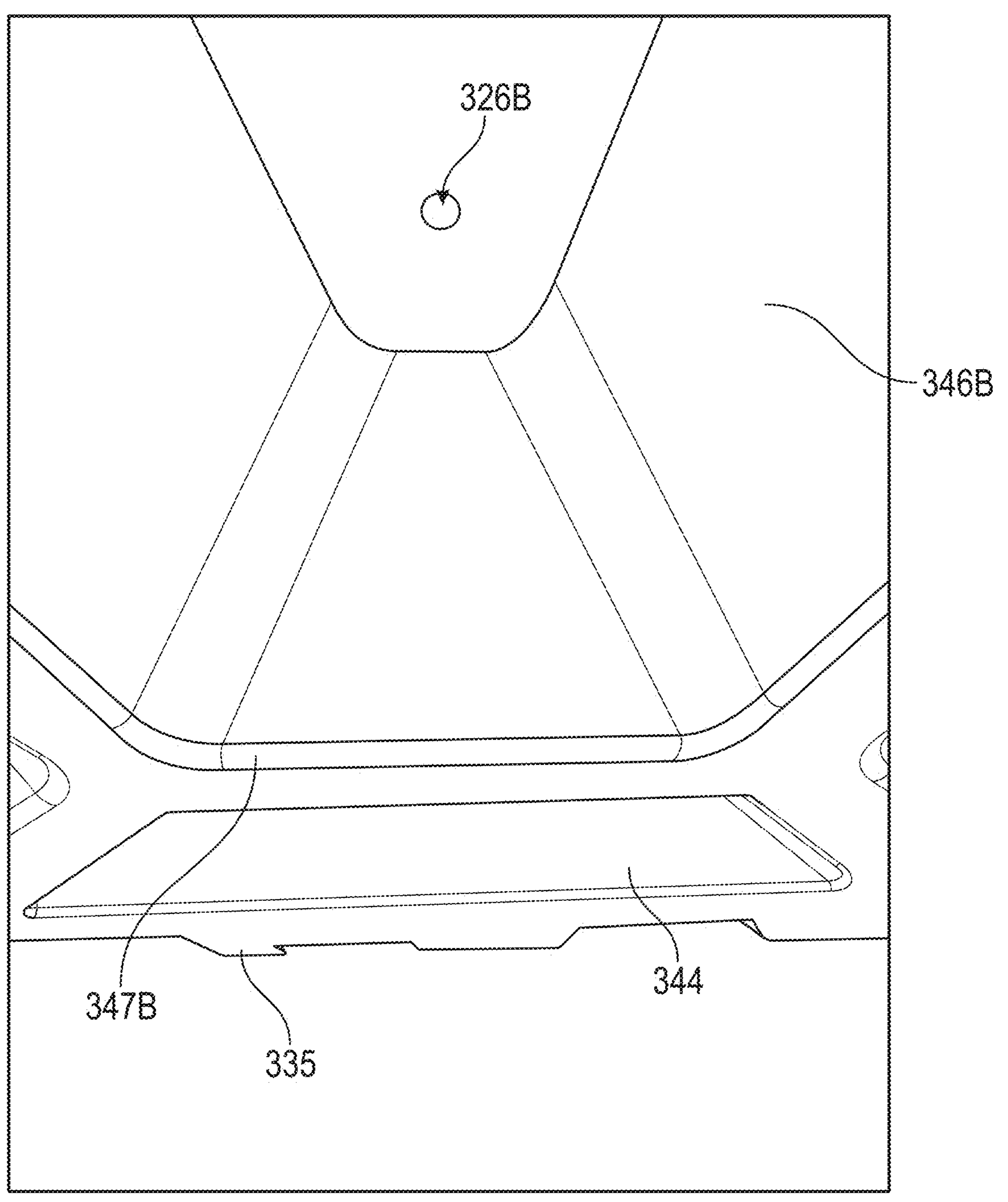
FIG. 15 shows an enlarged view of aspects of the planter bed section of FIG. 11.

FIG. 15 shows an enlarged view of the inside of the tube member 346B. As shown in FIG. 15, one end the of the tube member 346B culminates in and/or is operationally connected to the aperture 326B and the other end of the tube member 346B (the bottom end 347B) culminates in an opening positioned at and/or near the bottom edge 335 of the bottom portion 314. According to some embodiments, the length of each tube member 346A, 346B, measured from the operationally connected aperture (aperture 326B for tube member 346B) to the bottom end (bottom end 347B for the tube member 346B), can be approximately 18 inches. However, the length of each tube member 346A, 346B can be any suitable distance. According to some embodiments, the length of any tube member described herein, such as the tube members 44A, 44B can be approximately 18 inches. However, the length of the tube members 46A, 46B could be any suitable distance.

Figure 16:
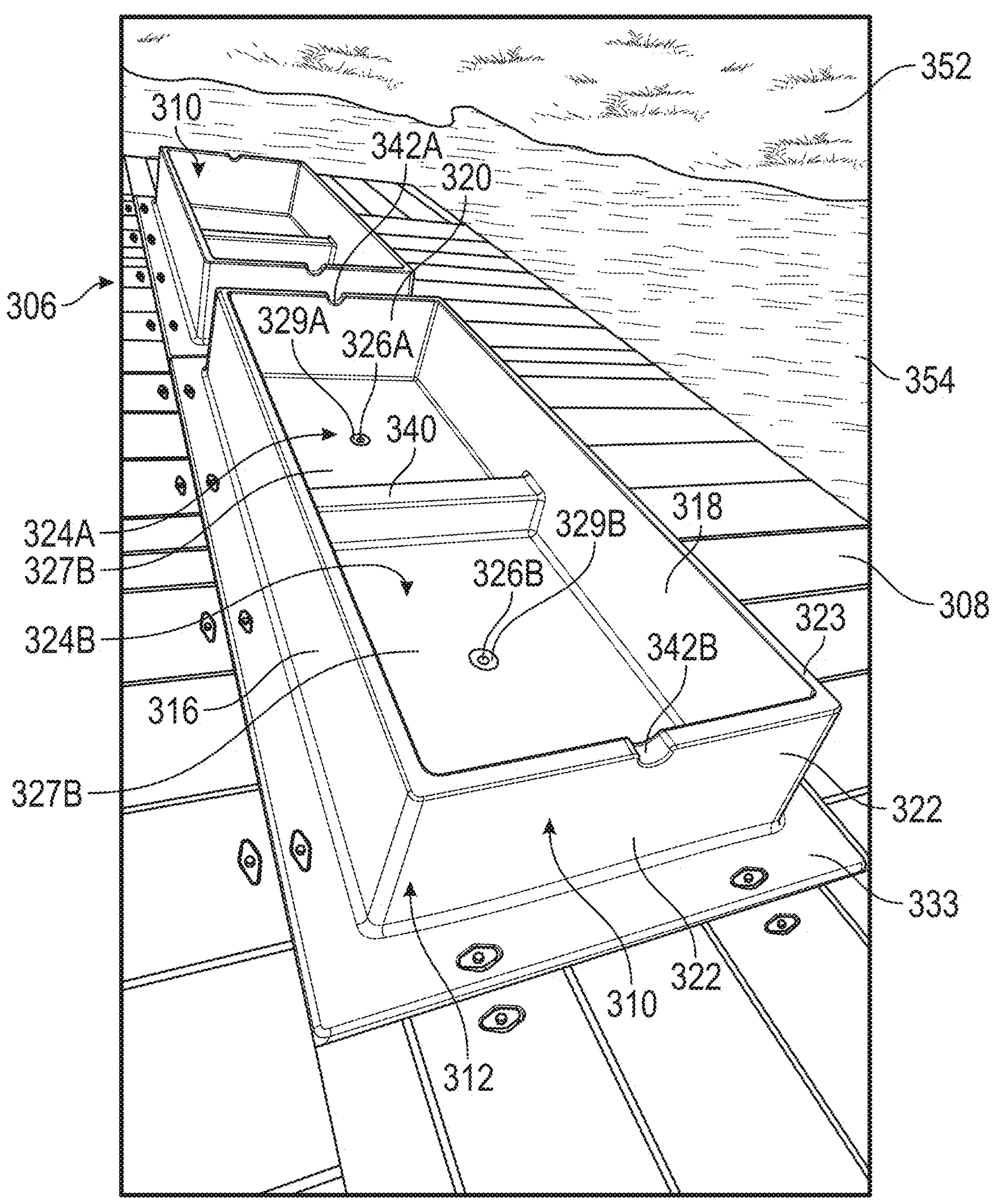
FIG. 16 shows a floating raised planter bed according to at least some aspects of the present disclosure wherein the floating raised planter bed comprises two of the planter bed sections of FIG. 11.

FIG. 16 shows a floating raised planter bed 306 according to at least some aspects of the present disclosure wherein the floating raised planter bed 306 comprises two planter bed sections 310 and at least one docking piece 308. The term floating raised planter bed can be used to refer to any planter bed structure similar to that described herein that comprises two or more planter bed sections such as planter bed sections 10, planter bed sections 110, planter bed sections 210, and/or planter bed sections 310. According to some embodiments, and as described herein, operative connection between multiple planter bed sections (such as by fastening) to form a floating raised planter bed can be accomplished via the hitch member(s) of the respective planter bed sections. Additionally or alternatively, operative connection of multiple planter bed sections to form a floating raised planter bed can be accomplished by operative connection of the multiple planter bed sections to one or more docking piece(s), which can be accomplished via the hitch member(s), wherein the docking piece(s) serve to position the multiple planter bed sections generally adjacently.

As shown in FIG. 16, the floating raised planter bed 306 is positioned such that it is floating on water 354 in close proximity to land 352. As noted herein, the floating raised planter bed 306, and any planter bed sections 310 thereof, are configured to be able to float on water.

Figure 17:
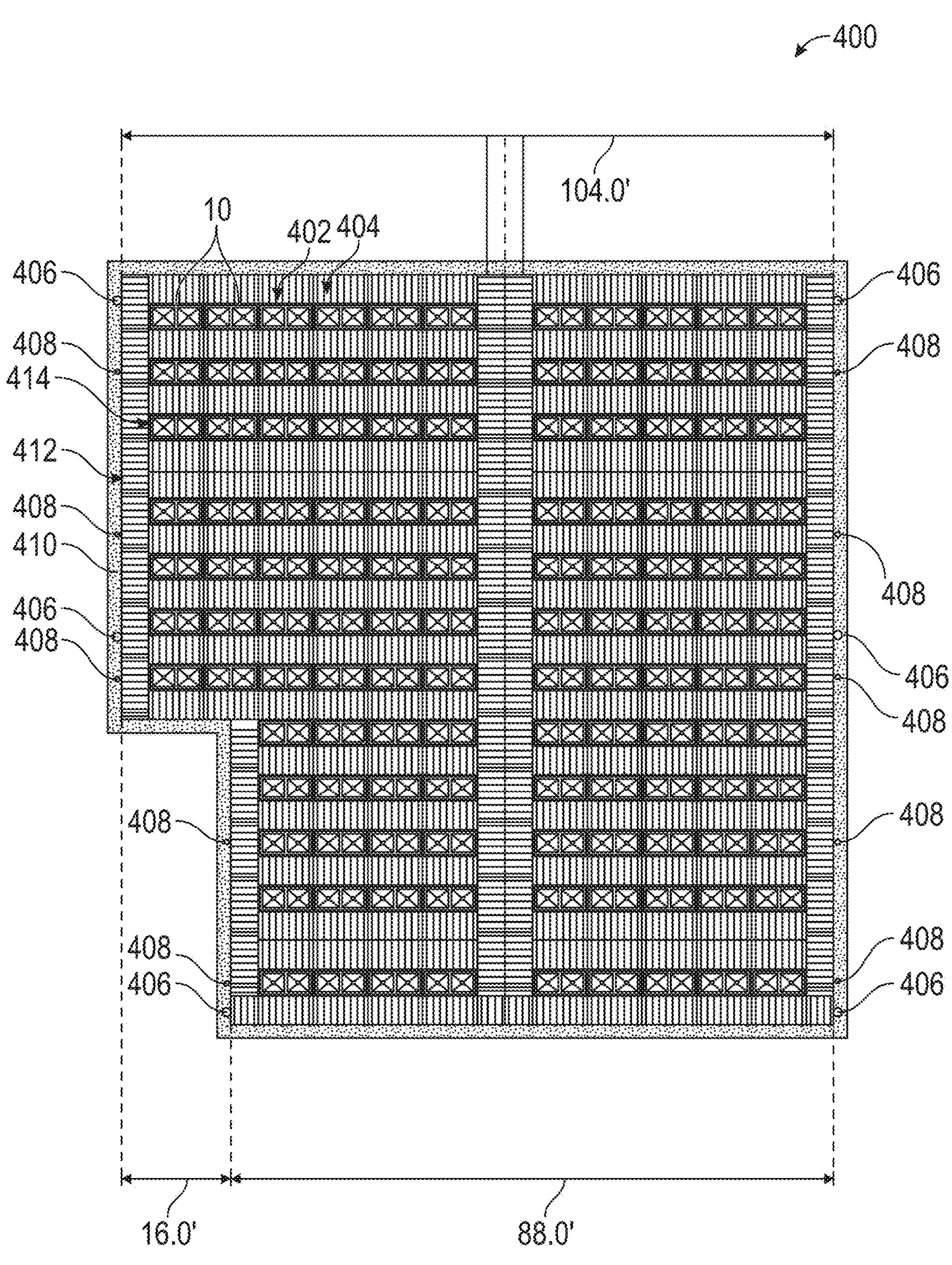
FIG. 17 shows a schematic view of a planter box layout according to at least some aspects of the present disclosure.

FIG. 17 shows a schematic view of a planter box layout 400 according to at least some aspects of the present disclosure. FIG. 17 shows a planter box layout 400 including a plurality of floating raised planter beds 402, a plurality of docking pieces 404, a plurality of pilings 406, a plurality of water sources 408, an aggregate base 410, a rubber bumper/wheelchair guard 412, and irrigation equipment and/or drip-lines 414. While FIG. 17 includes many floating raised planter beds 402, each comprised of several planter bed sections 10, for clarity only a couple planter bed sections 10 are labeled and only one floating raised planter bed 402 is labeled. For example, the floating raised planter bed 402 that is labeled in the top, left-hand portion of FIG. 17 comprises six planter bed sections 10. However, each floating raised planter bed of FIG. 17 could include any suitable number of planter bed sections. For example, some of the floating raised planter beds shown in FIG. 17 comprise 5 planter bed sections and some comprise four planter bed sections. Additionally, while FIG. 17 shows many docking pieces 404, for clarity only one docking piece 404 is labeled. Further, while FIG. 17 and the description thereof refers to the planter bed section 10, any planter bed section described herein, such as planter bed section 110, planter bed section 210, and/or planter bed section 310 could be used to form a floating raised planter bed 402.

According to some embodiments, the planter bed section 10 may be rectangularly shaped and adapted to be operatively connected to one or more similarly shaped sections to form a floating raised planter bed 402. For example, FIG. 17 shows several floating raised planter beds 402, wherein each floating raised planter bed 402 comprises multiple planter bed sections 10. As noted, the term floating raised planter bed 402 can be used to refer to any planter bed structure similar to that described herein that comprises two or more planter bed sections 10. According to some embodiments, and as described herein, operative connection between multiple planter bed sections 10 (such as by fastening) to form a floating raised planter bed 402 can be accomplished via the hitch member(s) 36 of the respective planter bed sections 10. Additionally or alternatively, operative connection of multiple planter bed sections 10 to form a floating raised planter bed 402 can be accomplished by operative connection of multiple planter bed sections 10 to one or more docking piece(s) 404, which can be accomplished via the hitch member(s) 36, wherein the docking piece(s) 404 serve to position the multiple planter bed sections 10 generally adjacently.

According to some embodiments, and as shown in FIG. 17, a planter bed section 10 and/or a floating raised planter bed 402 can be operatively attached to one or more docking piece(s) 404. Each docking piece 404 can be and/or comprise any sort of permanent, semi-permanent, and/or stationary dock-like structure capable of anchoring the planter bed section 10 and/or floating raised planter bed 402 in water. Additionally or alternatively, according to some embodiments, each docking piece 404 can be and/or comprise any sort of structure capable of anchoring and/or holding the planter bed section 10 and/or the floating raised planter bed 402 on and/or over land. According to some embodiments, each docking piece 404 can be capable of floating in water. The planter bed section 10 and/or floating raised planter bed 402 can be operatively connected to a docking piece 404 via any suitable connection and/or attachment means such as friction fit technology, use of nut(s) and bolt(s), screw(s), nail(s), tab(s), interlocking elements (such as mating elements), spacer(s), adhesive, hook and loop(s), snap(s), and the like and/or via the hitch member(s) 36 and/or chute member(s) 38.

As shown in FIG. 17, according to some embodiments, the planter bed layout 400 can include piling(s) 406. According to some embodiments, each piling 406 can be and/or comprise any sort of anchoring structure capable of anchoring a docking piece 404. For example, according to some embodiments, each piling 406 can be and/or comprise a dock piling, a post, a pole, and the like. According to some embodiments, each piling 406 can be driven into the ground to support and/or anchor the docking piece(s) 404, floating raised planter bed(s) 402, and/or planter bed section(s) 10.

As shown in FIG. 17, according to some embodiments, the planter bed layout 400 can include water source(s) 408. According to some embodiments, each water source 408 can be and/or comprise any sort of passage, channel, piping, pump, outlet, and the like capable of providing and/or facilitating liquid flow, such as water flow. Additionally or alternatively, each water source 408 can be and/or comprise an access point to any sort of body of water such as a retention basin, pond, lake, stream, creek, river, bay, ocean, and the like.

As shown in FIG. 17, according to some embodiments, the planter bed layout 400 can comprise an aggregate base 410. According to some embodiments, the aggregate base 410 can be and/or comprise any sort of construction aggregate. Such a construction aggregate could be composed of crushed rock, asphalt (such as recycled asphalt), concrete, and the like. According to some embodiments, the component particles of the aggregate base 410 could vary in size from 20 millimeters to dust. However, any suitably sized particles are contemplated herein. The aggregate base 410 can serve as a base and/or anchoring element for the docking piece(s) 404, piling(s) 406, floating raised planter bed(s) 402, and/or planter bed section(s) 10.

As shown in FIG. 17, according to some embodiments, the planter bed layout 400 can comprise one or more rubber bumpers and/or wheelchair guards 412. The one or more rubber bumpers and/or wheelchair guards 412 can be positioned on, at, or near the docking piece(s) 404 and can act as a bumper, guard, buffer, and the like to facilitate safe movement and transportation of people and/or objects on or near the docking piece(s) 404. For example, the one or more rubber bumpers and/or wheelchair guards 412 can prevent a person and/or object from inadvertently falling off of the docking piece(s) 404.

As shown in FIG. 17, according to some embodiments, the planter bed layout 400 can comprise one or more instances of irrigation equipment and/or driplines 414. According to some embodiments, the irrigation equipment and/or driplines 414 can comprise any combination of hoses, supply lines, sprinklers, spouts, and the like capable of supplying liquid, such as water, to particular areas of the docking piece(s) 404, floating raised planter bed(s) 402, and/or the planter bed section(s) 10. The irrigation equipment and/or driplines 414 can be configured to deliver liquid, such as water, to particular areas of the docking piece(s) 404, floating raised planter bed(s) 402, and/or the planter bed section(s) 10.

As shown in FIG. 17, according to some embodiments, the total width of the planter bed layout 400 can be 104 feet, wherein a smaller portion of the total width is 16 feet and a larger portion of the total width is 88 feet. However, the planter bed layout 400 could include any suitable dimensions. According to some embodiments, each planter bed section 10 shown in FIG. 17 could have a width and length of 4 feet×8 feet. However, the planter bed section 10 could include any suitable dimensions such as other dimensions described herein.

According to some embodiments, the one or more docking piece(s) 404 are floating and the planter bed section 10 and/or floating raised planter bed 402 is used for growing plant material over a body of water. According to some embodiments, such a body of water could be and/or comprise a retention basin, pond, lake, stream, creek, river, bay, ocean, and the like.

According to some embodiments, the one or more docking piece(s) 404 are not floating and the planter bed section 10 and/or floating raised planter bed 402 is used for growing plant material over land. According to some embodiments, such land could be and/or comprise a flood plain.

The planter bed section(s) 10 and/or the floating raised planter bed 402 is configured such that a user and/or machine can place seed and/or plant material in and/or at the planter bed section 10 and/or the floating raised planter bed 402. Such seed and/or plant material can be related to human or animal nutrition, ornamental purposes, medicinal purposes, fuel or fiber purposes, and/or any other suitable purpose.

Figure 18:
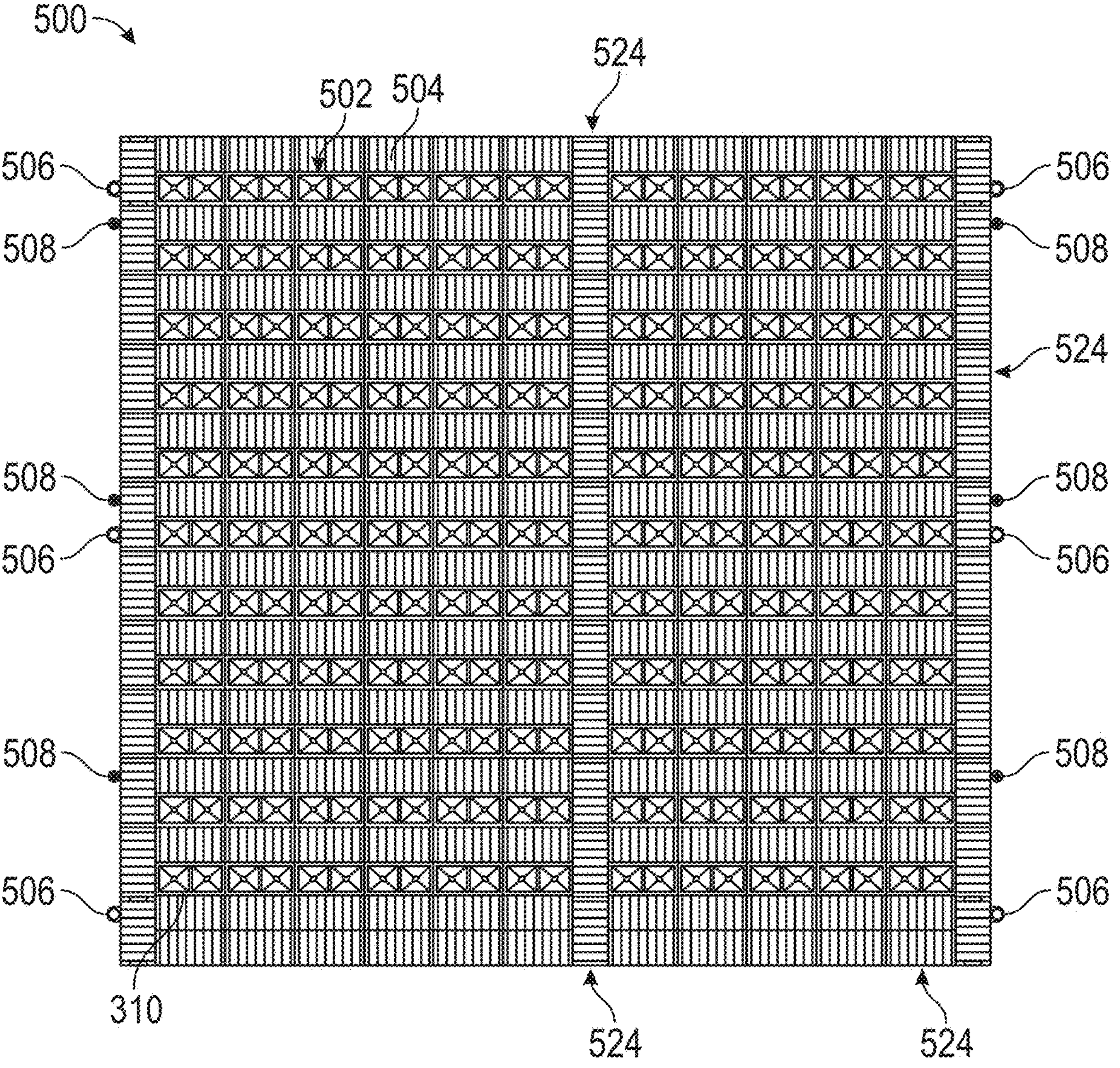
FIG. 18 shows a schematic view of a planter box layout according to at least some aspects of the present disclosure.

FIG. 18 shows a schematic view of a planter box layout 500 according to at least some aspects of the present disclosure. According to some embodiments, the planter box layout 500 can be approximately 100 feet in width and approximately 98 feet in length or vice versa. However, the planter box layout 500 could have any suitable dimensions. FIG. 18 shows a planter box layout 500 that includes a plurality of floating raised planter beds 502, a plurality of docking pieces 504, a plurality of pilings 506, a plurality of water sources 508, and a plurality of ramp/stair access points 524. While FIG. 18 includes many floating raised planter beds 502, each comprised of several planter bed sections 310, for clarity only one planter bed section 310 is labeled and only one floating raised planter bed 502 is labeled. Additionally, while FIG. 18 shows many docking pieces 504, for clarity only one docking piece 504 is labeled. Further, while FIG. 18 and the description thereof refers to the planter bed section 310, any planter bed section, such as planter bed section 10, planter bed section 110, or planter bed section 210, could be used to form a floating raised planter bed 502.

According to some embodiments, the planter bed section 310 may be generally rectangularly shaped and adapted to be operatively connected to one or more similarly shaped sections to form a floating raised planter bed 502. For example, FIG. 18 shows several floating raised planter beds 502, wherein each floating raised planter bed 502 comprises multiple planter bed sections 310. The term floating raised planter bed 502 can be used to refer to any planter bed structure similar to that described herein that comprises two or more planter bed sections 310, or any other planter bed section described herein. According to some embodiments, and as described herein, operative connection between multiple planter bed sections 310 (such as by fastening) to form a floating raised planter bed 502 can be accomplished via the hitch member(s) 336 of the respective planter bed sections 310. Additionally or alternatively, operative connection of multiple planter bed sections 310 to form a floating raised planter bed 502 can be accomplished by operative connection of multiple planter bed sections 310 to one or more docking piece(s) 504, which can be accomplished via the hitch member(s) 336, wherein the docking piece(s) 504 serve to position the multiple planter bed sections 310 generally adjacently.

According to some embodiments, and as shown in FIG. 18, a planter bed section 310 and/or a floating raised planter bed 502 can be operatively attached to one or more docking piece(s) 504. Each docking piece 504 can be the same as and/or similar to and can function in the same and/or similar manner and for the same and/or similar purpose as any docking piece described herein such as the docking piece(s) 404. The planter bed section 310 and/or floating raised planter bed 502 can be operatively connected to a docking piece 504 via any suitable connection and/or attachment means such as friction fit technology, use of nut(s) and bolt(s), screw(s), nail(s), tab(s), interlocking elements (such as mating elements), spacer(s), adhesive, hook and loop(s), snap(s), and the like and/or via the hitch member(s) 336 and/or chute member(s) 338.

Each piling 506 can be the same as and/or similar to and can function in the same and/or similar manner and for the same and/or similar purpose as any piling described herein such as the piling(s) 406.

Each water source 508 can be the same as and/or similar to and can function in the same and/or similar manner and for the same and/or similar purpose as any water source described herein such as the water source(s) 408.

Each ramp/stair access point 524 can be any sort of open and/or available portion of a docking piece 504 of the planter bed layout 500 to which a ramp and/or stairs could be operationally attached. For example, according to some embodiments, each ramp/stair access point 524 could comprise any sort of suitable connection and/or attachment means to be able to operationally attach to a ramp and/or stairs. Such connection and/or attachment means could comprise friction fit technology, use of nut(s) and bolt(s), tab(s), interlocking elements (such as mating elements), spacer(s), adhesive, hook and loop(s), snap(s), magnet(s), rope(s), and the like and/or members that are the same and/or similar to any hitch member or chute member described herein. Any sort of ramp, stairs, and/or combination thereof could be attached to the planter bed layout 500, and/or a docking piece 504 thereof, at any of the ramp/stair access points 524 such that a person could enter the planter bed layout 500, and/or a docking piece 504 thereof, via a ramp and/or stairs and/or a ramp/stair access point 524. For example, a person could use a ramp and/or stairs operationally attached to a ramp/stair access point 524 to walk onto, move onto via a wheelchair or other device, or otherwise enter the planter bed layout 500, and/or a docking piece 504 thereof.

It should be appreciated that, according to some embodiments, the planter bed layout 500 can include one or more rubber bumpers and/or wheelchair guards. Said one or more rubber bumpers and/or wheelchair guards can be the same as and/or similar to and can function in the same and/or similar manner and for the same and/or similar purpose as any rubber bumper and/or wheelchair guard described herein such as the rubber bumper and/or wheelchair guard(s) 412.

It should be further appreciated that, according to some embodiments, the planter bed layout 500 can include irrigation equipment and/or driplines. Such irrigation equipment and/or driplines can be the same as and/or similar to and can function in the same and/or similar manner and for the same and/or similar purpose as any irrigation equipment and/or driplines described herein such as the irrigation equipment and/or driplines 414.

Figure 19:
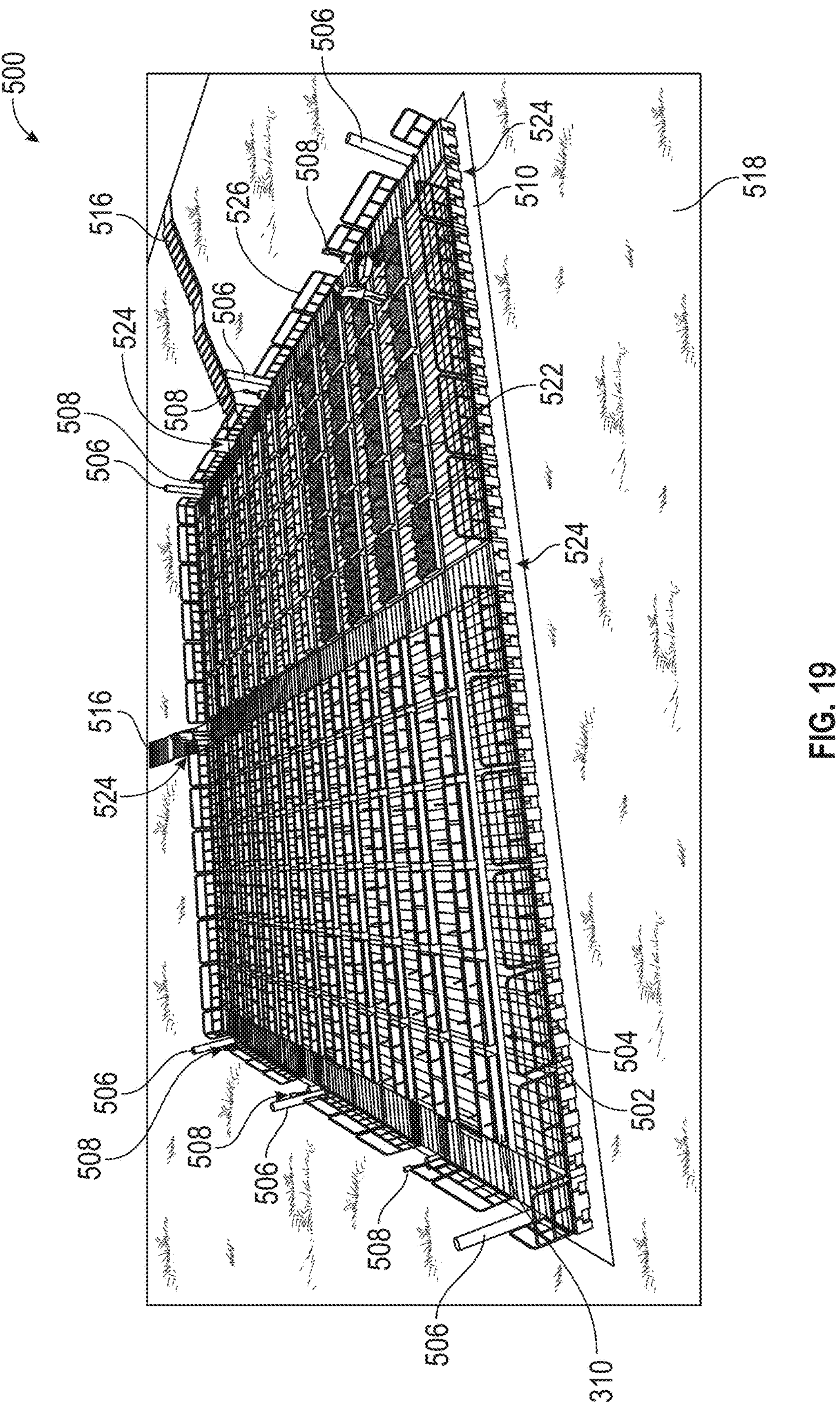
FIG. 19 shows a perspective view of the planter box layout of FIG. 18 positioned on land.
Figure 20:
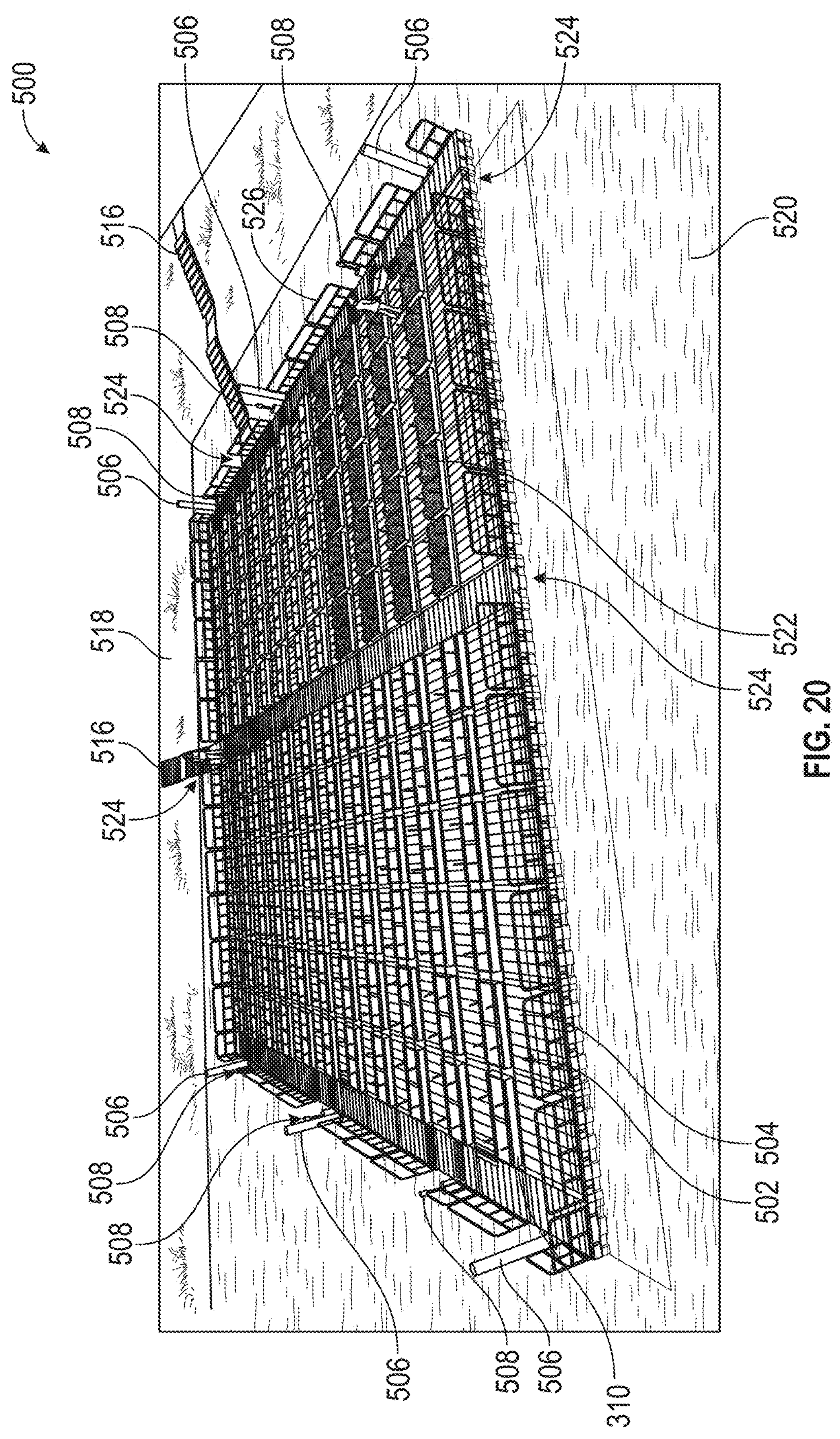
FIG. 20 shows a perspective view of the planter box layout of FIG. 18 positioned on water.

It should be further appreciated that the planter bed layout 500 can be used on water and/or on land. For example, FIG. 19 shows a perspective view of the planter bed layout 500 positioned on land 518, and FIG. 20 shows a perspective view of the planter bed layout 500 positioned on water 520. As shown in FIG. 19, the planter bed layout 500 can further include an aggregate base 510. The aggregate base 510 can be the same as and/or similar to and can function in the same and/or similar manner and for the same and/or similar purpose as any aggregate base described herein such as the aggregate base 410. Further, the planter bed layout 500 can include a plurality of railing sections 526. It is noted that while the planter bed layout 500 is shown to have multiple railing sections 526 in FIGS. 19 and 20, only one is labeled for the sake of clarity of the Figures. While FIGS. 19 and 20 show a plurality of railing sections 526, any number of railing sections 526 can be included ranging from zero to N where N is any number greater than zero. Each railing section 526 can comprise any sort of railing and/or support structure configured to provide stability for any person using the planter bed layout 500. Further, while specific ramp/stair access points 524 are shown in FIG. 18, any outer portion of the planter bed layout 500, and/or docking pieces 504 thereof, that does not comprise a railing section 526 could comprise and/or serve as a ramp/stair access point.

As shown in FIGS. 19 and 20, the planter bed layout 500 can include a ramp, stairs, and/or combination thereof 516. For example, FIGS. 19 and 20 each show two sets of a combined ramp/stairs 516. However, according to some embodiments, the planter bed layout 500 can include any number of ramps, stairs, and/or combinations thereof ranging from zero to N where N is any number greater than zero. The ramp, stairs, and/or combination thereof 516 can be any sort of ramp, stairs, or combination thereof capable of allowing a person to traverse the ramp, stairs, or combination thereof.

Further, as shown in FIGS. 19 and 20, each of the planter bed sections 310 of the planter bed layout 500 can contain dirt, soil, seed, and/or planter material 522. While several planter bed sections 310 are shown to contain dirt, soil, seed, and/or plant material 522, only one instance of dirt, soil, seed, and/or planter material 522 is labeled to maintain clarity of the Figure. While only some of the planter bed sections 310 are shown to contain dirt, soil, seed, and/or plant material 522, none, some, or all of the planter bed sections 310 of the planter bed layout 500 can container dirt, soil, seed, and/or plant material 522.

Therefore, as understood from the present disclosure, the planter bed section and/or floating raised planter bed described herein can serve to mitigate flood damage, plant loss, and compromised landscaping. The planter bed section and/or floating raised planter bed can be configured to have a built-in buoyant structure that allows it to rise and float during flooding events, which not only safeguards the plants it contains but also enhances flood resilience in urban and suburban areas. Additionally, the buoyant nature of the planter bed section and/or the floating raised planter bed as well as the ability to provide improved water drainage, allows the planter bed section and/or floating raised planter bed to be mobile and adaptable. Further the buoyant flotation capability of the planter bed section and/or the floating raised planter bed enables easy relocation and adjustment of any garden layout. For example, the planter bed section and/or floating raised planter bed allows gardeners to effortlessly adapt to changing sunlight conditions. Further, the planter bed section and/or floating raised planter bed provide for improved water drainage and root aeration for healthier plant growth. Even further, the planter bed section and/or floating raised planter bed make it possible to create aquatic gardens with ease, improve the utilization of limited garden space, enable the easy removal of plants for maintenance or replacement, and reduce the environmental impact through water conservation and plant protection during floods or heavy rain.

From the foregoing, it can be seen that the present disclosure accomplishes at least all of the stated objectives.

Glossary

Unless defined otherwise, all technical and scientific terms used herein have the same meaning as commonly understood by one of ordinary skill in the art to which embodiments of the present disclosure pertain.

The terms "a," "an," and "the" include both singular and plural referents.

The term "or" is synonymous with "and/or" and means any one member or combination of members of a particular list.

The term "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the term "exemplary" refers to an example, an instance, or an illustration, and does not indicate a most preferred embodiment unless otherwise stated.

The term "about" as used herein refers to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variables, given proper context.

The term "generally" encompasses both "about" and "substantially."

The term "configured" describes structure capable of performing a task or adopting a particular configuration. The term "configured" can be used interchangeably with other similar phrases, such as "constructed", "arranged", "adapted", "manufactured", and the like.

Terms characterizing sequential order, a position, and/or an orientation are not limiting and are only referenced according to the views presented.

The terms "invention" or "present invention" are not intended to refer to any single embodiment of the particular invention but encompass all possible embodiments as described in the specification and the claims.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A method of using a planter bed section, the method comprising:

operatively attaching a planter bed section to a floating docking piece, wherein:

the planter bed section comprises:

a top portion comprising:

first and second side walls;

first and second end walls; and one or more recesses located between the first and second side walls, wherein each of the one or more recesses comprises an aperture;

a bottom portion operatively attached to the top portion, the bottom portion comprising:

first and second opposing sides;

first and second opposing ends;

one or more tube members wherein one of the one or more tube members is operatively connected to each aperture of the one or more recesses; and wherein the planter bed section is used for growing plant material over a body of water.

* * * * *